United States Patent
Ding

(10) Patent No.: US 12,292,364 B2
(45) Date of Patent: May 6, 2025

(54) ENRICHER, ENRICHMENT SYSTEM, SAMPLE MANUFACTURING SYSTEM, AND SAMPLE DETECTION SYSTEM

(71) Applicant: AVE SCIENCE & TECHNOLOGY CO., LTD., Changsha (CN)

(72) Inventor: Jianwen Ding, Changsha (CN)

(73) Assignee: AVE SCIENCE & TECHNOLOGY CO., LTD., Changsha (CN)

( * ) Notice: Subject to any disclaimer, the term of this patent is extended or adjusted under 35 U.S.C. 154(b) by 426 days.

(21) Appl. No.: 17/779,708

(22) PCT Filed: Dec. 17, 2019

(86) PCT No.: PCT/CN2019/125838
§ 371 (c)(1),
(2) Date: May 25, 2022

(87) PCT Pub. No.: WO2021/103200
PCT Pub. Date: Jun. 3, 2021

(65) Prior Publication Data
US 2023/0038927 A1   Feb. 9, 2023

(30) Foreign Application Priority Data
Nov. 27, 2019 (CN) .......................... 201911181291.8

(51) Int. Cl.
*G01N 21/25* (2006.01)
*G01N 1/30* (2006.01)
*G01N 1/40* (2006.01)

(52) U.S. Cl.
CPC ............. *G01N 1/4005* (2013.01); *G01N 1/30* (2013.01); *G01N 1/40* (2013.01); *G01N 21/25* (2013.01); *G01N 2001/4088* (2013.01)

(58) Field of Classification Search
CPC .................. G01N 1/40; G01N 1/4005; G01N 2001/4088; G01N 30/08; G01N 2030/146; G01N 1/30; G01N 21/25
See application file for complete search history.

(56) References Cited

U.S. PATENT DOCUMENTS

| 7,341,669 B2 | 3/2008 | Ferguson | |
| 7,546,925 B1 * | 6/2009 | Zuk, Jr. | B01D 63/081 |
| | | | 210/474 |
| 2019/0195755 A1 * | 6/2019 | Im | G02B 21/34 |

FOREIGN PATENT DOCUMENTS

| CN | 206787889 U | 12/2017 |
| CN | 107576555 A | 1/2018 |

(Continued)

OTHER PUBLICATIONS

International Search Report and Written Opinion from International Application No. PCT/CN2019/125838 mailed Apr. 27, 2020.

(Continued)

*Primary Examiner* — Paul M. West
(74) *Attorney, Agent, or Firm* — Hemisphere Law, PLLC; Zhigang Ma

(57) ABSTRACT

An enricher, an enrichment system, a sample manufacturing system, and a sample detection system. The enricher comprises an enrichment housing, which encloses to form an enrichment cavity used for accommodating a suction liquid; a suction connection part, which is used to place a suction mechanism in communication with the enrichment cavity so that the enrichment cavity forms negative pressure under a vacuumization mechanism; and a blocking member, which is disposed on the enrichment housing; when the enrichment cavity forms negative pressure, a sample can, by means of the blocking member, form a suction liquid that enters the enrichment cavity, and a retentate remains on the blocking member.

18 Claims, 17 Drawing Sheets

(56) References Cited

FOREIGN PATENT DOCUMENTS

| | | | |
|---|---|---|---|
| CN | 207423629 U | 5/2018 |
| CN | 110283693 A | 9/2019 |
| CN | 209485830 U | 10/2019 |
| CN | 209485831 U | 10/2019 |
| CN | 111007238 A | 4/2020 |
| KR | 20130109406 A | 10/2013 |
| KR | 20180052197 A | 5/2018 |
| KR | 102013277 B1 | 8/2019 |
| WO | 2013166338 A2 | 11/2013 |
| WO | 2019204333 A1 | 10/2019 |

OTHER PUBLICATIONS

Extended European Search Report for European Application No. 19953941.2 mailed Dec. 19, 2022.
Office Action for Indian Application No. 202247035679 mailed Apr. 10, 2022.

\* cited by examiner

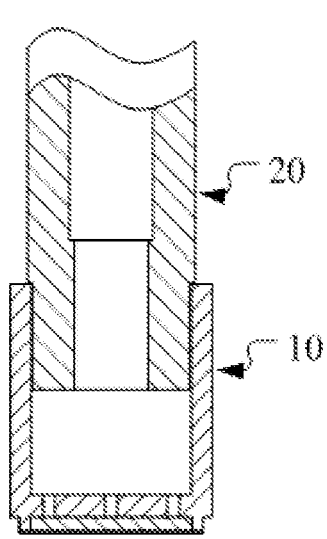
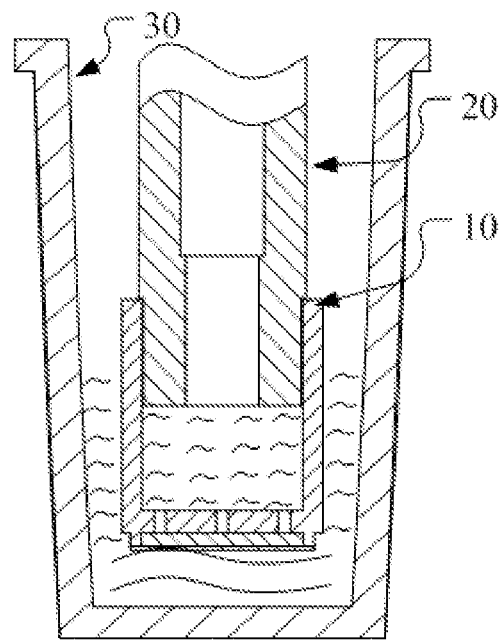
FIG. 34
FIG. 35
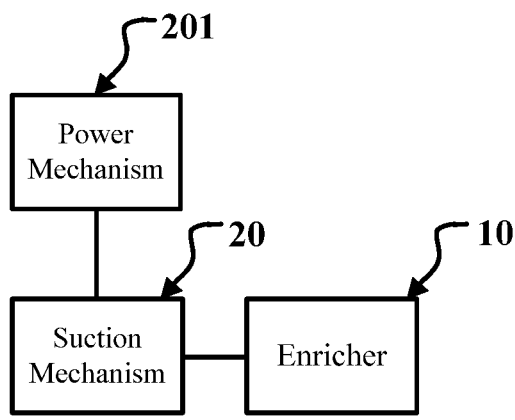
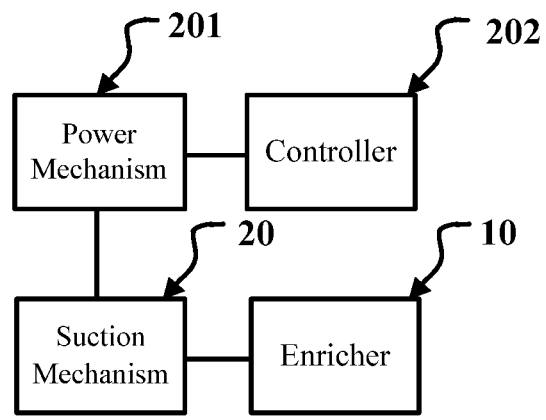
FIG. 36
FIG. 37

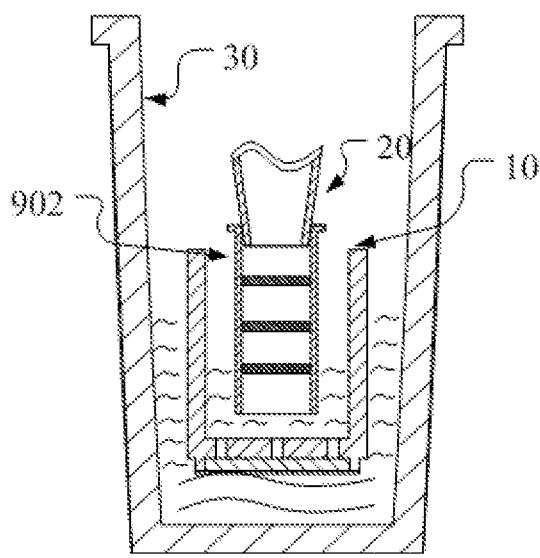
FIG. 50
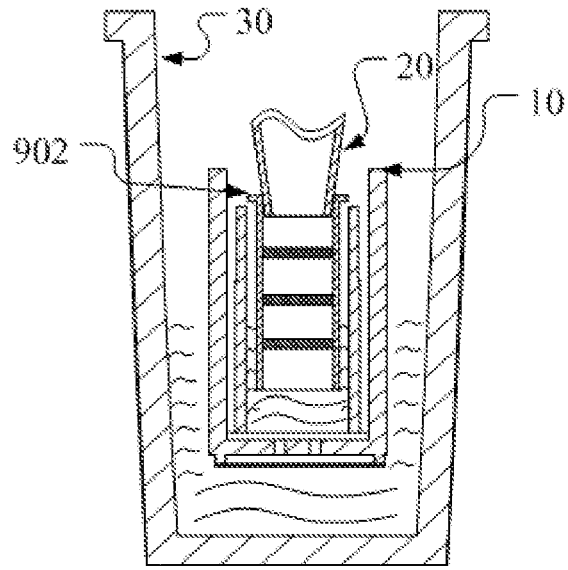
FIG. 51
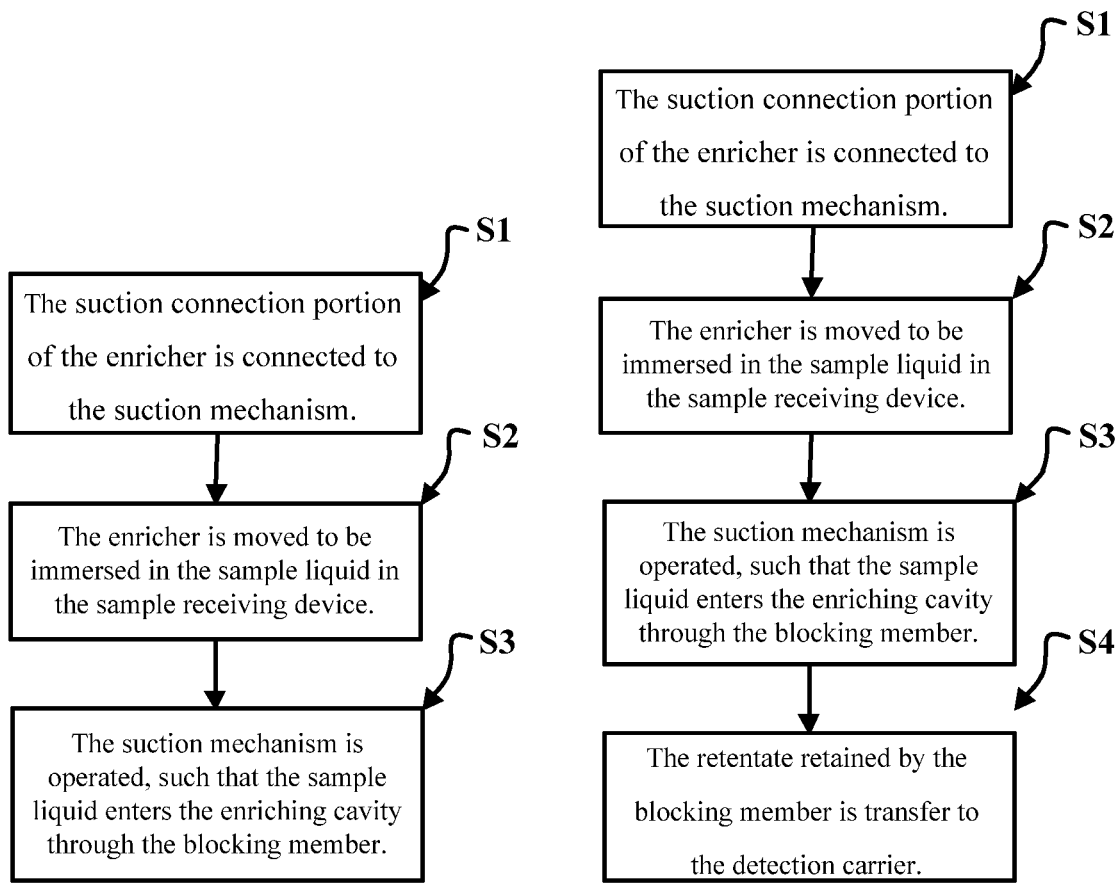
FIG. 52
FIG. 53

ENRICHER, ENRICHMENT SYSTEM, SAMPLE MANUFACTURING SYSTEM, AND SAMPLE DETECTION SYSTEM

CROSS REFERENCE TO RELATED APPLICATION

This application is a U.S. National Stage of PCT International Application No. PCT/CN2019/125838 filed on Nov. 27, 2019, which claims priority to Chinese Patent Application No. 201911181291.8, entitled "ENRICHER, ENRICHING SYSTEM, SAMPLE PREPARATION SYSTEM, AND SAMPLE DETECTION SYSTEM", filed on Nov. 27, 2019, the entire content of each of which is incorporated herein by reference.

TECHNICAL FIELD

The present disclosure relates to the technical field of medical detection, and more particularly, to an enricher, an enriching system, a sample preparation system, and a sample detection system.

BACKGROUND

Medical detection is to detect samples such as the collected blood, body fluid, secretion, excrement, exfoliation and so on via visual observation, microscopy, physical, chemical, instrumental or molecular biology methods. In order to improve the detection rate of the formed components in the samples, the samples need to be enriched.

At present, enriching methods mainly include centrifugal precipitation and natural precipitation. The centrifugal precipitation method is that the sample is centrifuged to remove the supernatant and the precipitate is taken for detection; the natural precipitation method is that the sample is left standing for a certain period of time to form a precipitation, and then the supernatant is removed and a suction liquid is taken for detection. The aforementioned different enriching methods require respective corresponding sample processing devices to transfer samples or process samples, thereby increasing the cost of enriching and further increasing the detection cost of medical detection. In addition, in the aforementioned enriching methods, the enriching processing time is relatively long due to the need to transfer samples or process samples.

Therefore, how to reduce the detection cost of medical detection is an urgent problem to be solved by those skilled in the art.

SUMMARY

Accordingly, the technical problem to be solved by the present disclosure is how to reduce the detection cost of medical detection, and for this reason, the present disclosure provides an enricher, an enriching system, a sample preparation system, and a sample detection system.

To achieve the aforementioned object, the present disclosure provides the following technical solutions:

An enricher includes an enriching housing, a suction connection portion and a blocking member. The enriching housing encloses an enriching cavity configured to receive a suction liquid. The suction connection portion is configured to be in communication with a suction mechanism and the enriching cavity, such that a negative pressure is generated in the enriching cavity under an action of the vacuuming mechanism. The blocking member is provided on the enriching housing. When the negative pressure is generated in the enriching cavity, a sample is capable of penetrating the blocking member to form the suction liquid entering the enriching cavity, and a retentate is retained on the blocking member.

An enriching system includes a suction mechanism and any one of the aforementioned enrichers. The suction mechanism is configured to be connected to the suction connection portion, the suction mechanism is configured to be capable of generating the negative pressure in the enriching cavity of the enricher.

A sample preparation system includes a sample transferring mechanism and any one of the aforementioned enriching system. The sample transferring mechanism is configured to transfer the retentate on the blocking member to a detection carrier.

A sample detection system includes a microscope and any one of the aforementioned sample detection systems. The microscope is configured to microscopically examine the specimen.

It can be seen from the aforementioned technical solutions that when the enricher of the present disclosure is in application, the enriching cavity is in communication with the suction mechanism via the suction connection portion, and the portion of the enriching housing provided with the blocking member is in contact with the sample. The suction mechanism operates to generate the negative pressure in the enriching cavity, and under an action of the negative pressure, the sample penetrates the blocking member to form the suction liquid entering the enriching cavity, and the retentate is retained on the blocking member. Compared with the prior art, the enricher is capable of being in contact with the sample directly to complete the enriching processing of the sample, and does not require additional sample transfer device or sample processing device, thereby reducing the cost of sample enriching and further reducing the cost of medical detection. In addition, since this enricher is adopted, there is no need to transfer samples or process samples additionally, such that the time for sample enriching processing is shortened.

BRIEF DESCRIPTION OF THE DRAWINGS

In order to explain the embodiments of the present disclosure or the technical solutions in the prior art more clearly, the following briefly introduces the accompanying drawings that need to be used in the description of the embodiments or the prior art. Obviously, the accompanying drawings in the following description are only some embodiments of the present disclosure. For those of ordinary skill in the art, other drawings can also be obtained from these drawings without creative efforts.

FIGS. 34 to 39 are schematic views of an enriching system according to a second embodiment of the present disclosure;

FIGS. 44 to 51 are schematic views of a sample detection system according to a fourth embodiment of the present disclosure;

FIG. 52 is a schematic flowchart of an enriching method according to a fifth embodiment of the present disclosure;

FIG. 53 is a schematic flowchart of a sample preparation method according to a sixth embodiment of the present disclosure;

Figure 1:
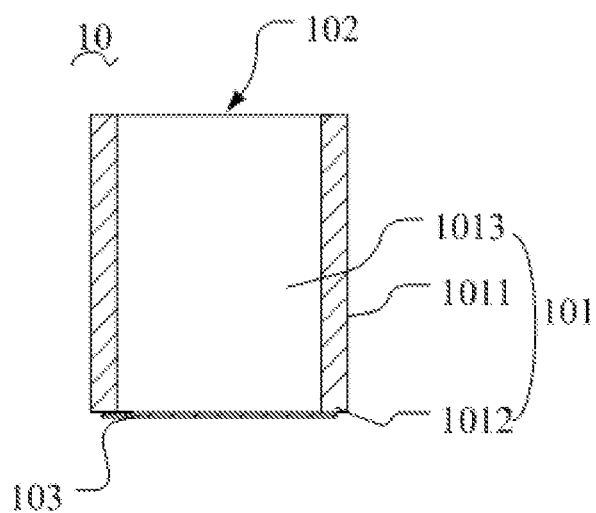
FIGS. 1 to 33 are schematic views of an enricher according to a first embodiment of the present disclosure.
Figure 2:
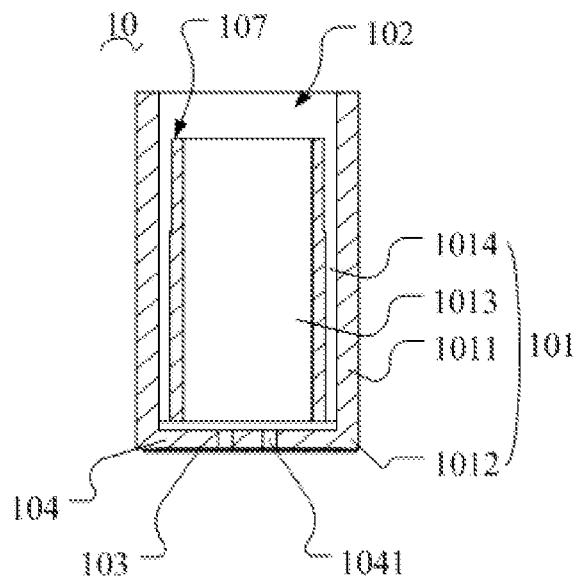
Figure 3:
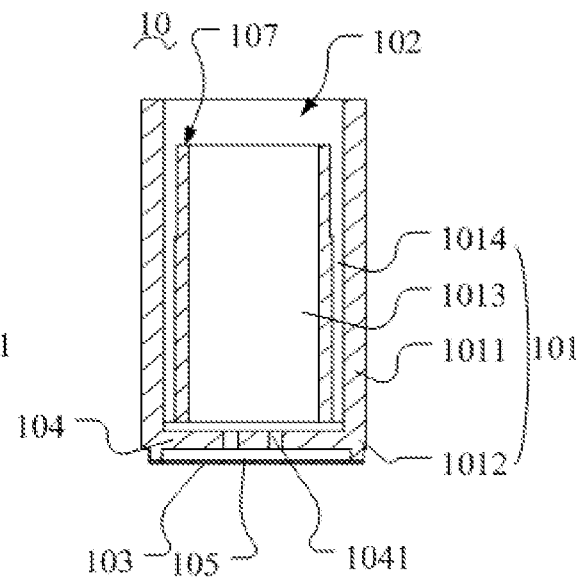
Figure 4:
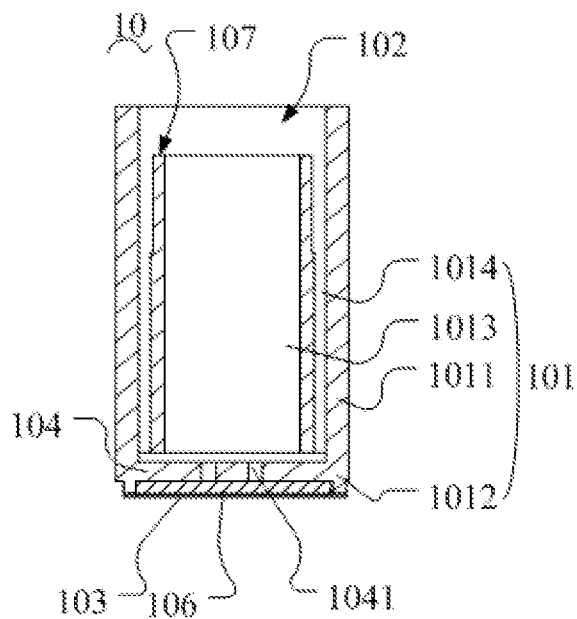
Figure 5:
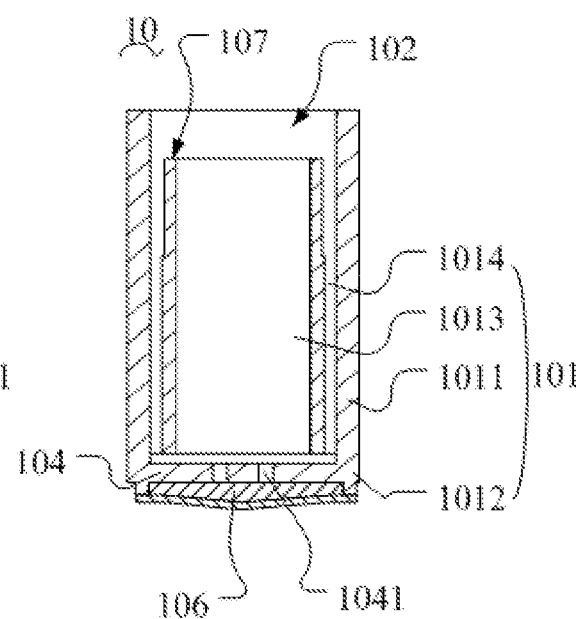
Figure 6:
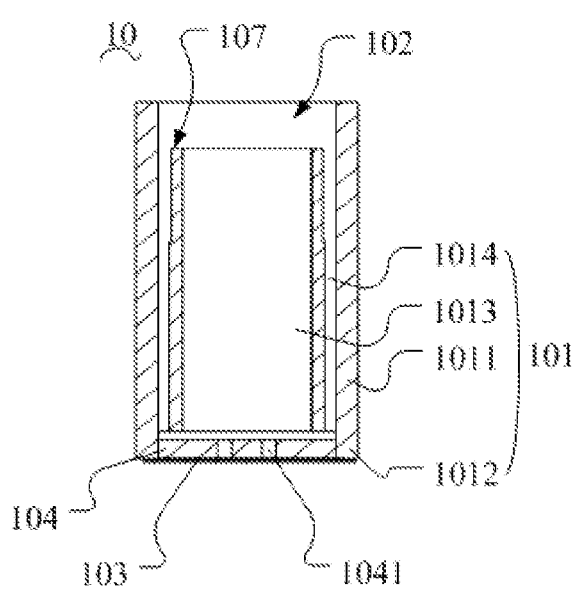
Figure 7:
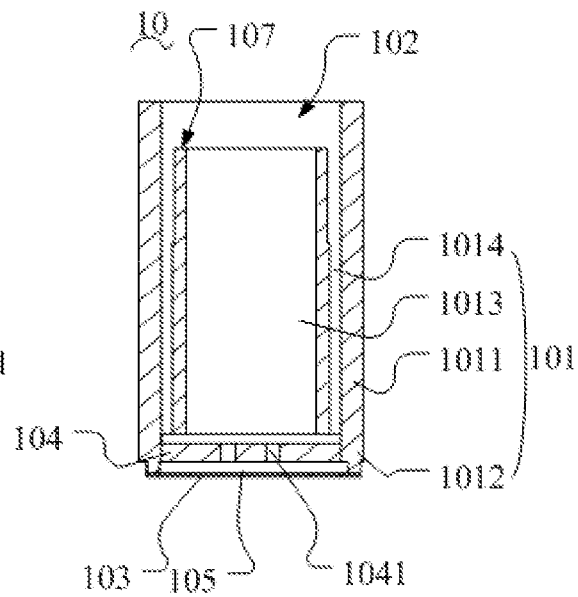
Figure 8:
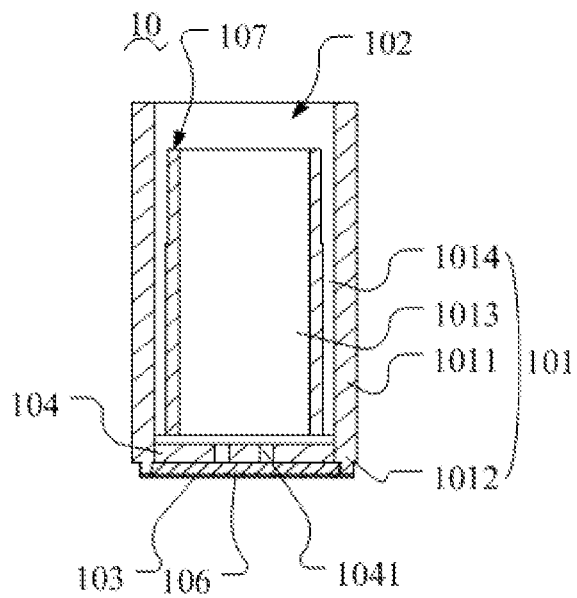
Figure 9:
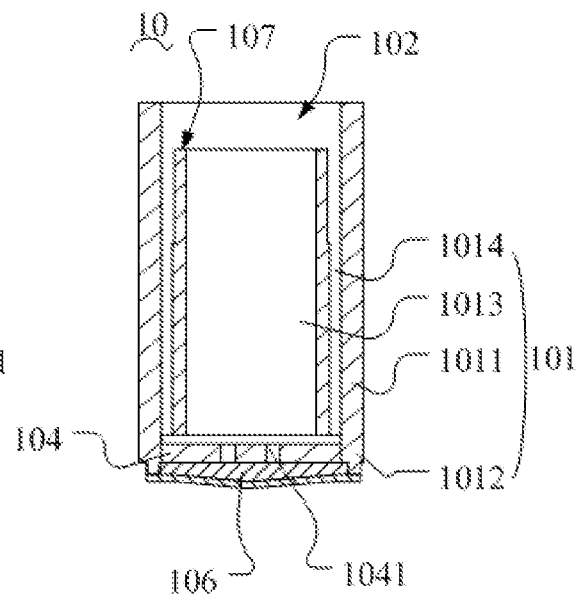
Figure 10:
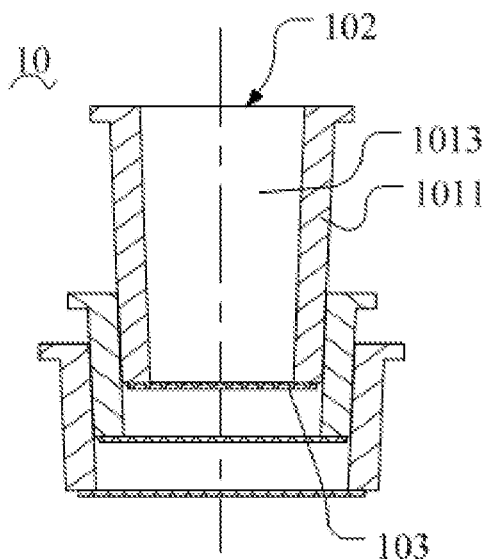
Figure 11:
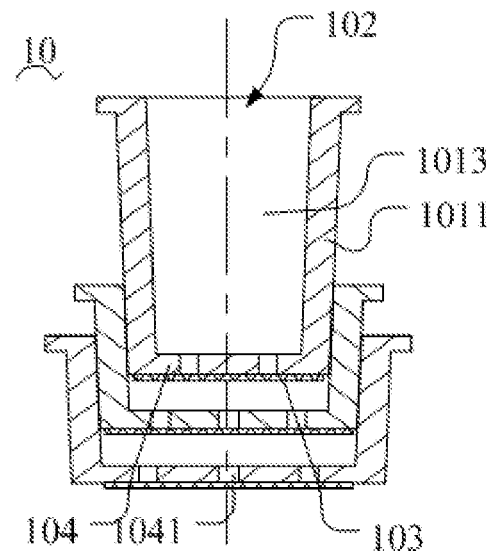
Figure 12:
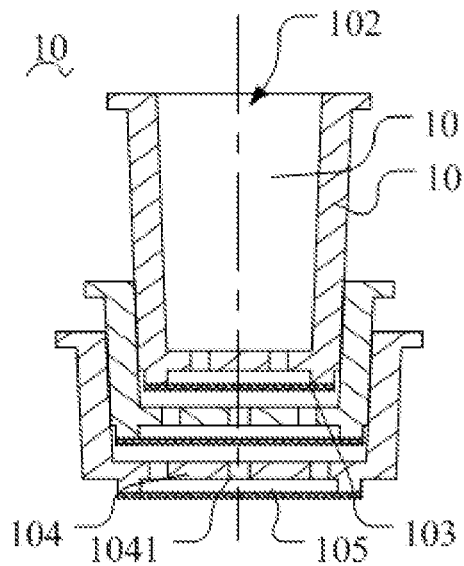
Figure 13:
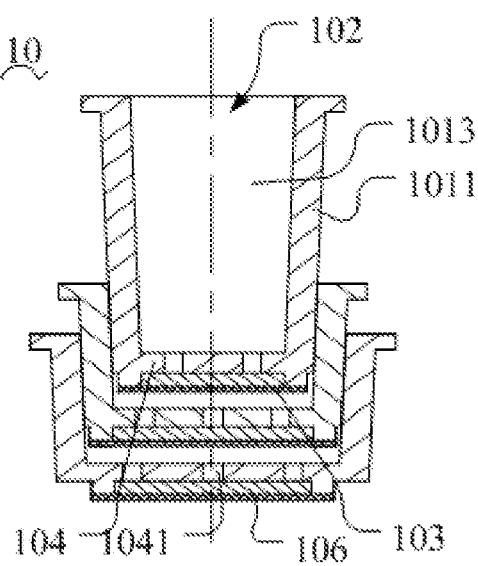
Figure 14:
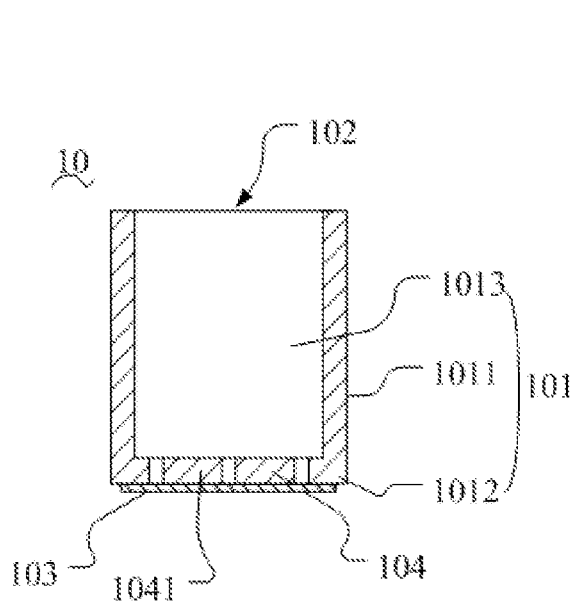
Figure 15:
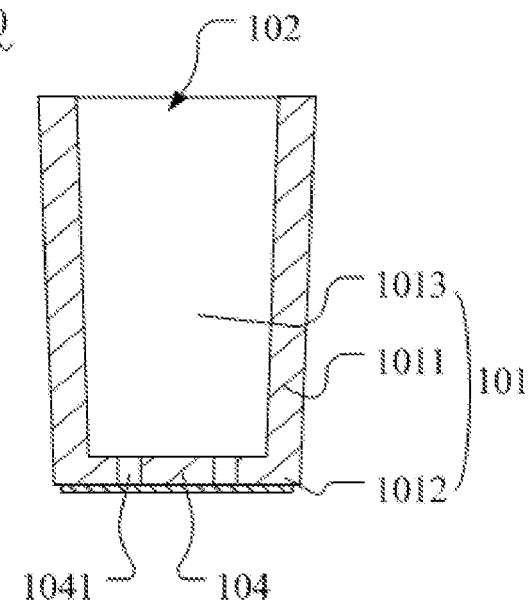
Figure 16:
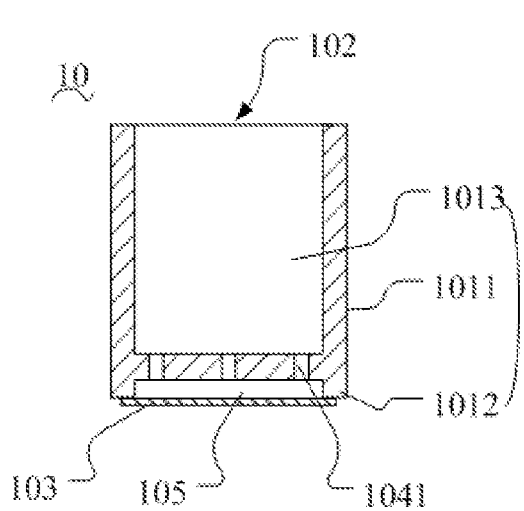
Figure 17:
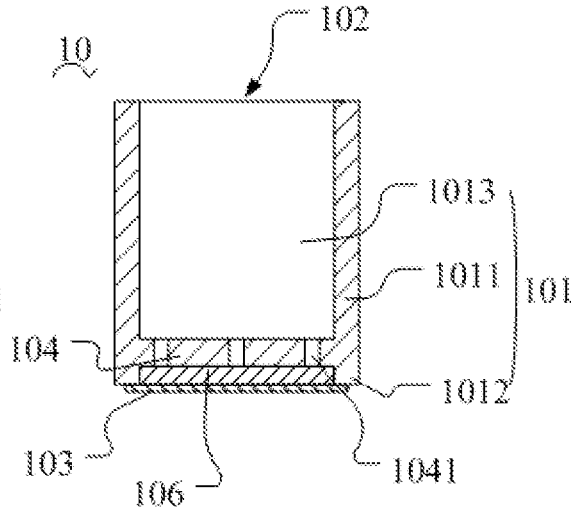
Figure 18:
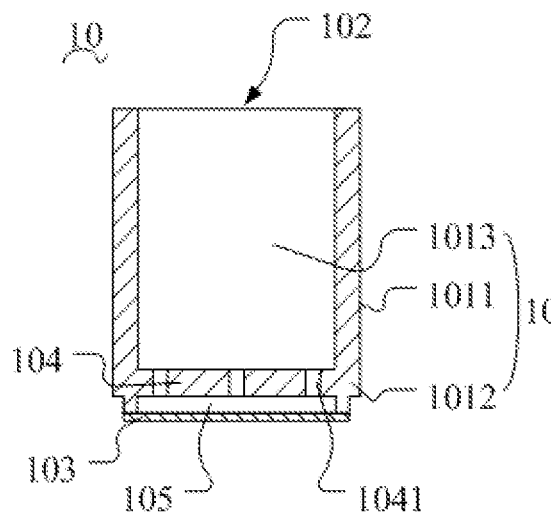
Figure 19:
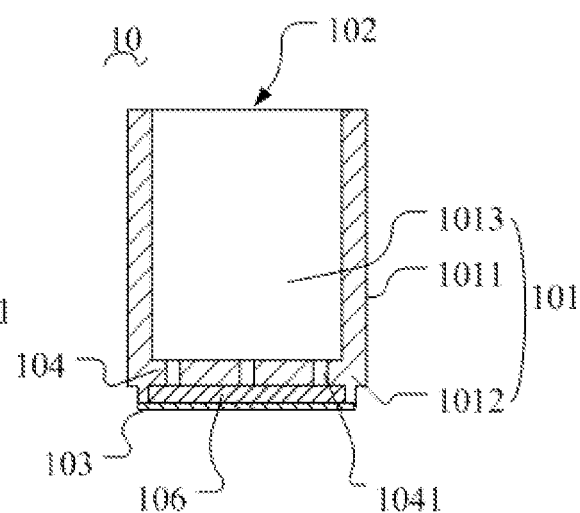
Figure 20:
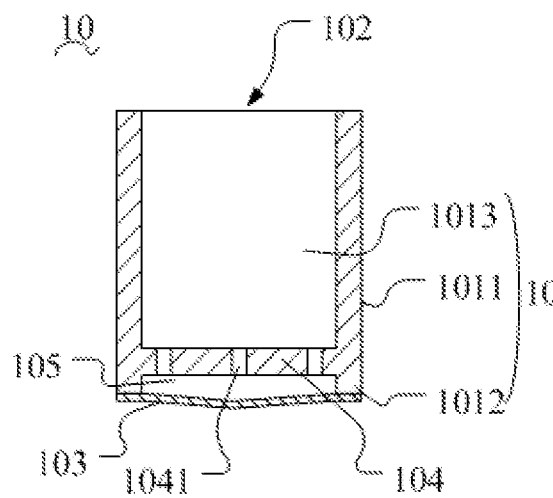
Figure 21:
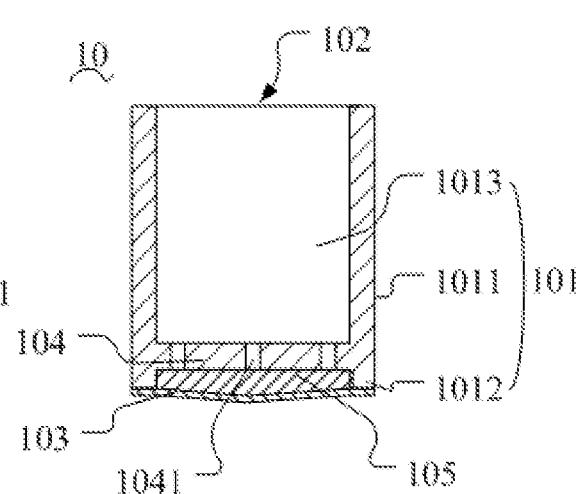
Figure 22:
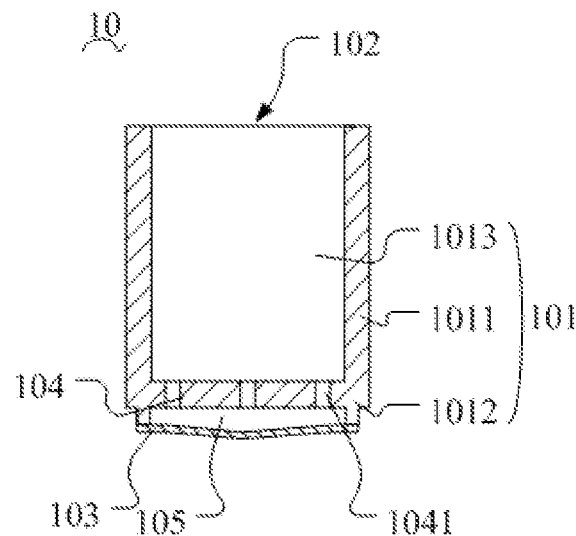
Figure 23:
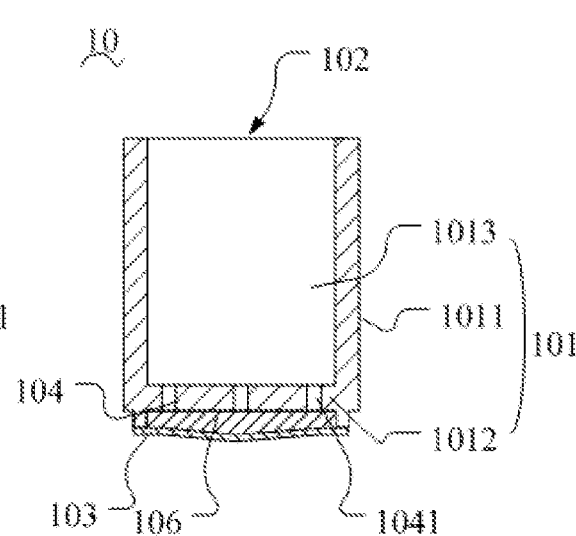
Figure 24:
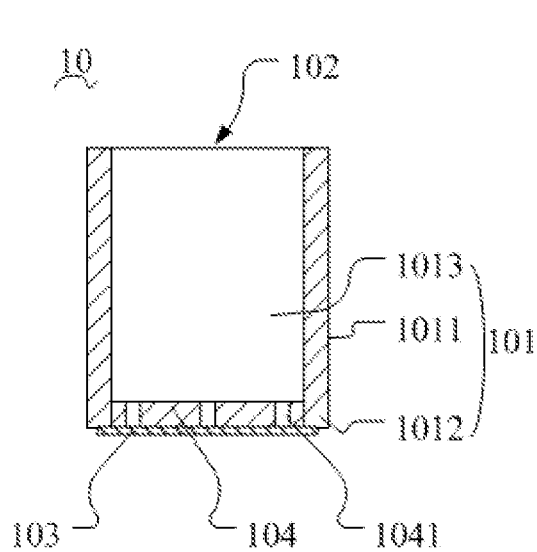
Figure 25:
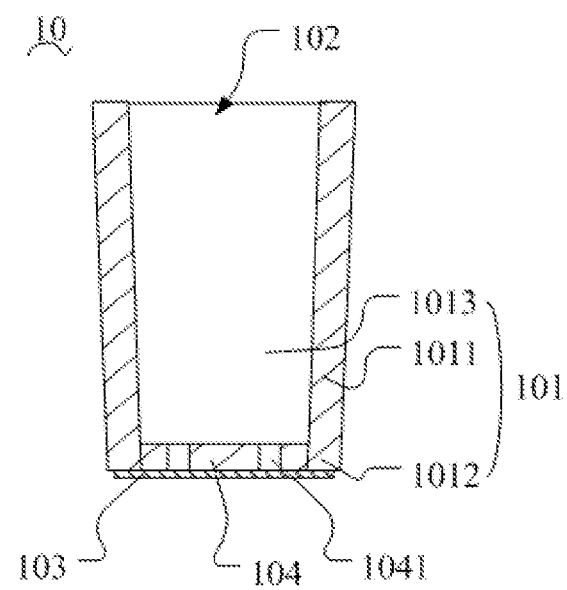
Figure 26:
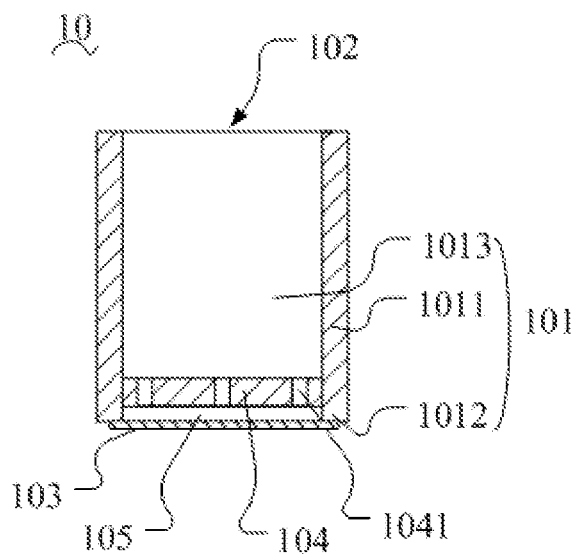
Figure 27:
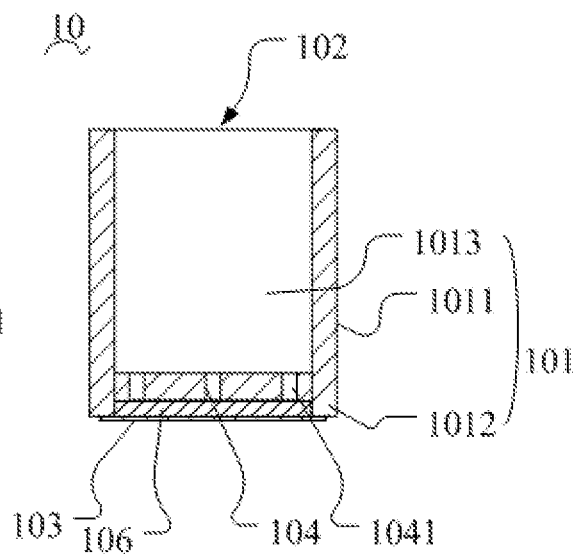
Figure 28:
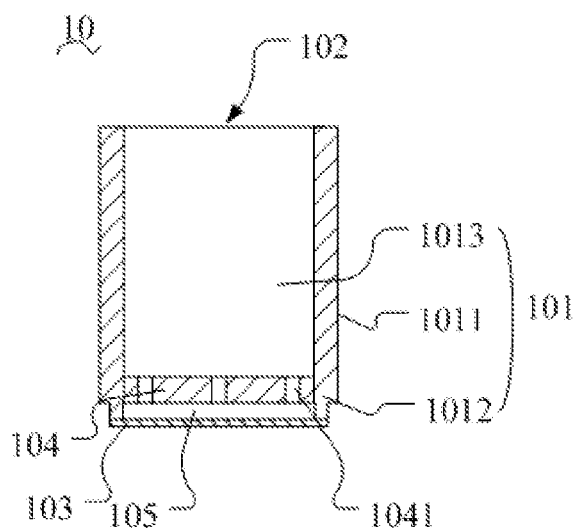
Figure 29:
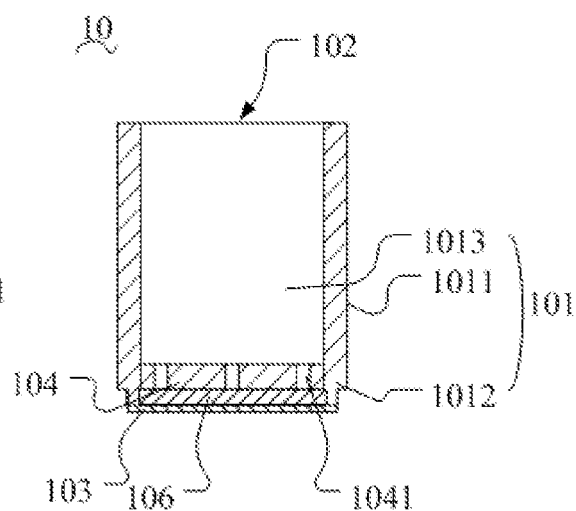
Figure 30:
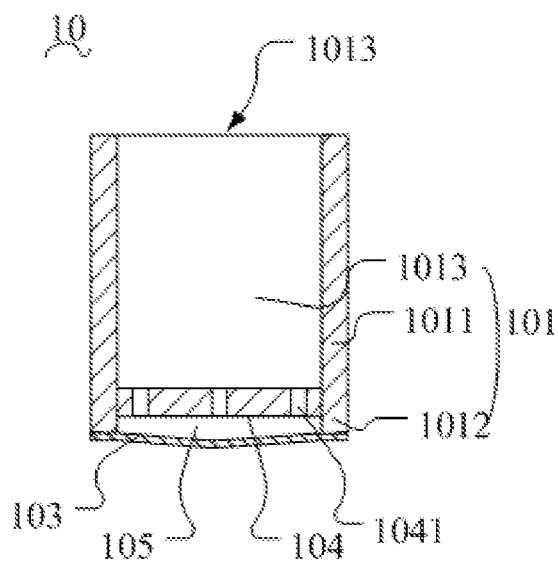
Figure 31:
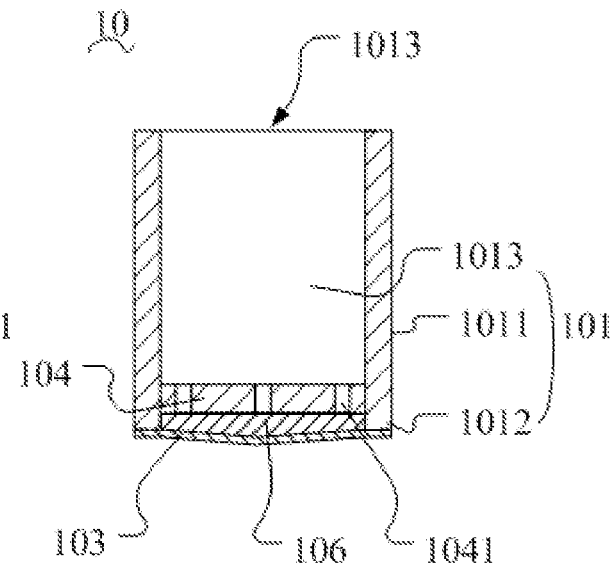
Figure 32:
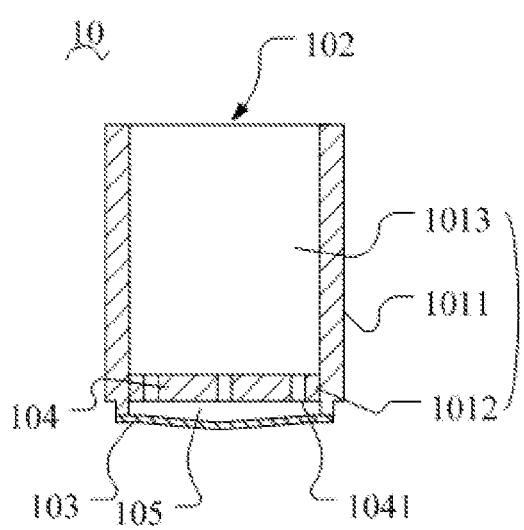
Figure 33:
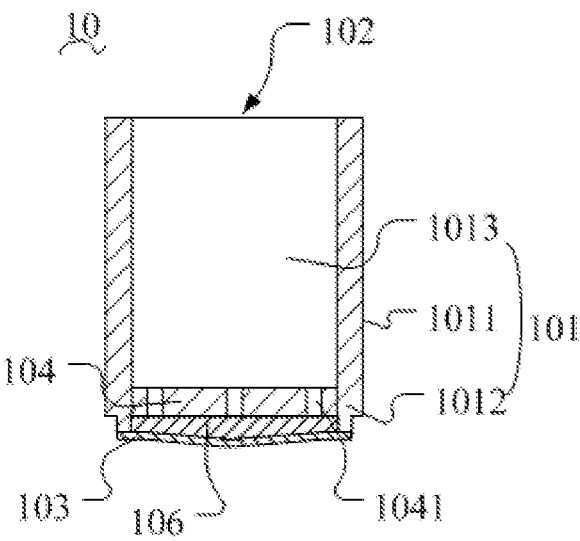
Figure 38:
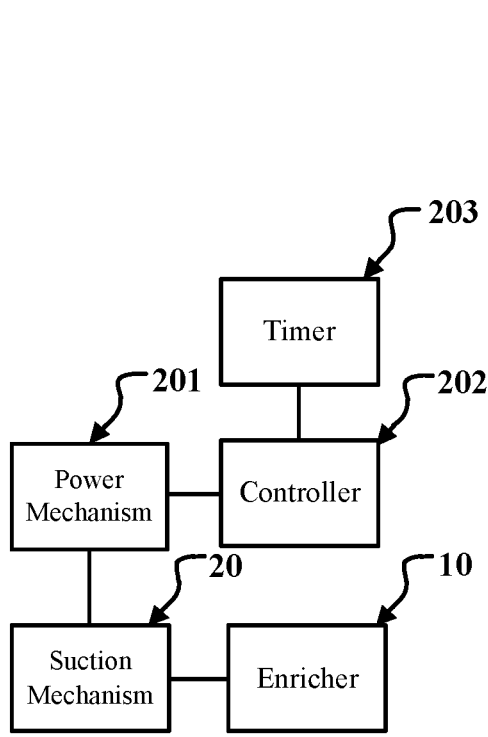
Figure 39:
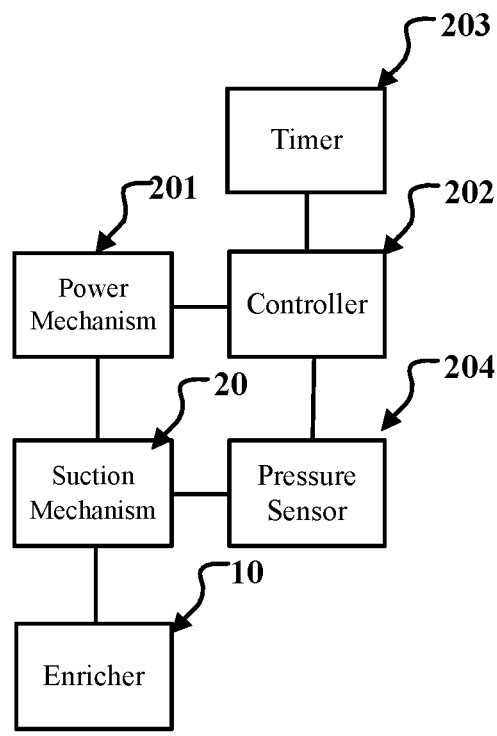
Figure 40:
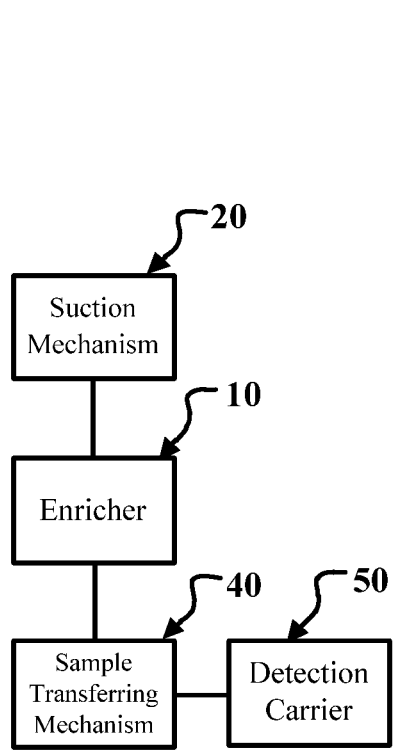
FIGS. 40 to 43 are schematic views of a sample preparation system according to a third embodiment of the present disclosure.
Figure 41:
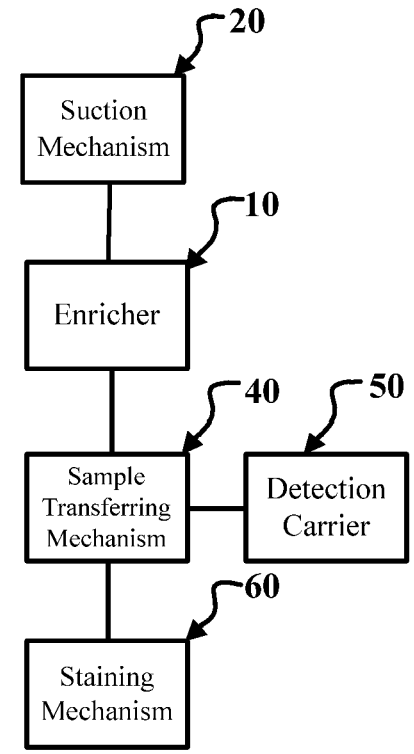
Figure 42:
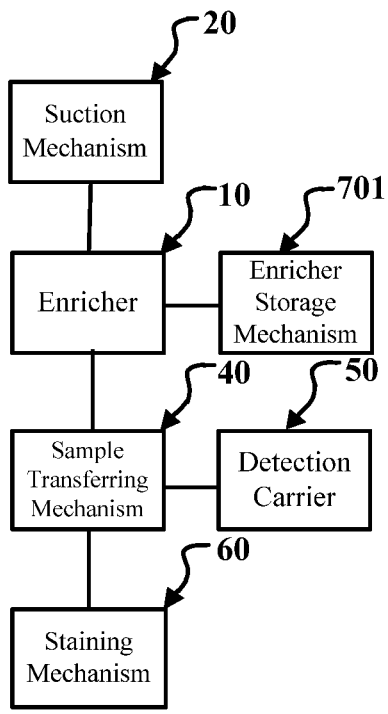
Figure 43:
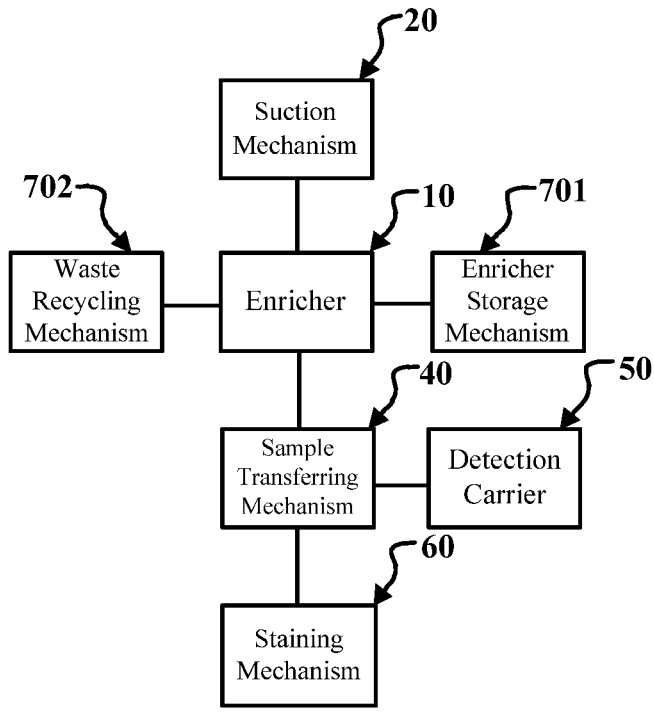
Figure 44:
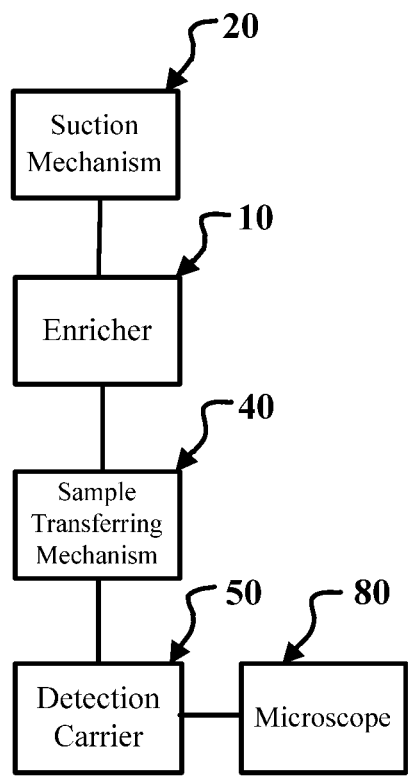
Figure 45:
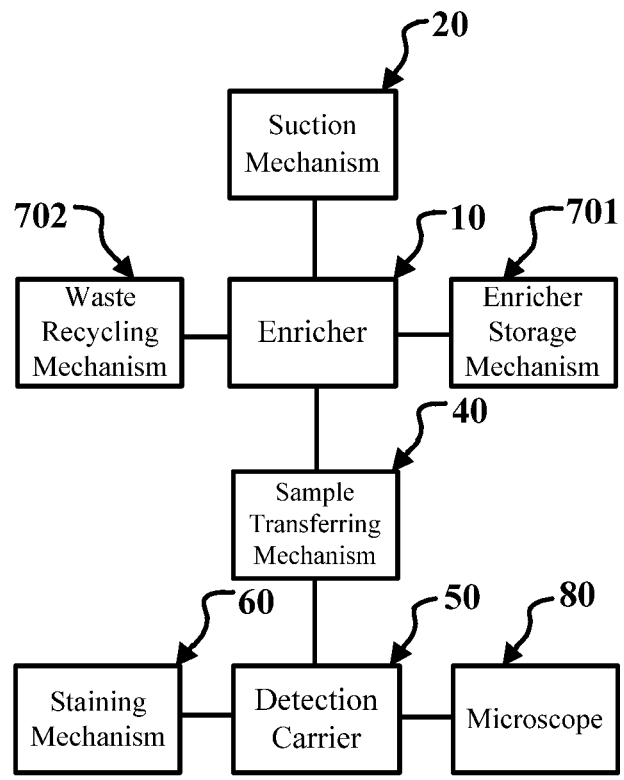
Figure 46:
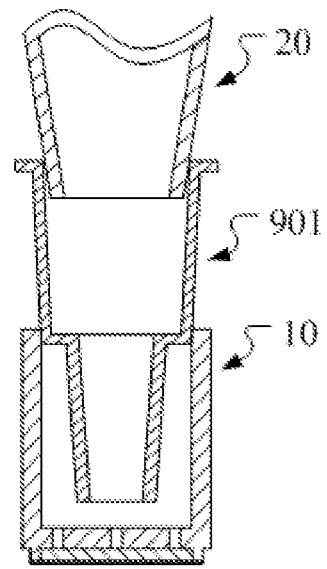
Figure 47:
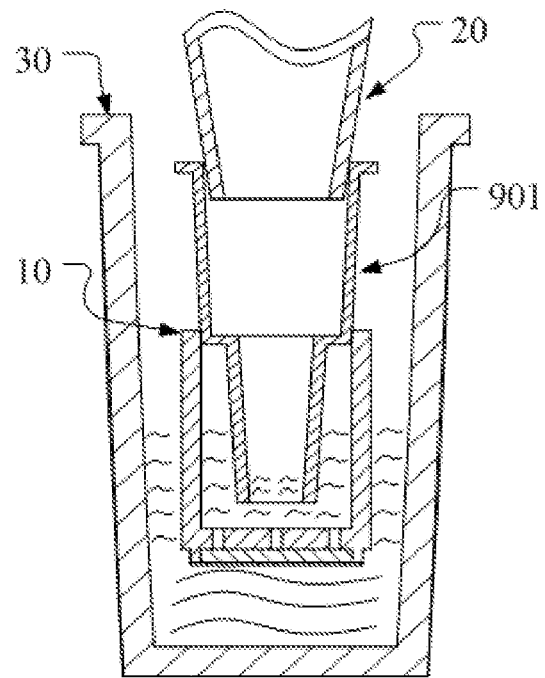

In the figures, 10 is an enricher, 20 is a suction mechanism, 30 is a sample receiving device, 40 is a sample transferring mechanism, 50 is a detection carrier, 60 is a staining mechanism, 701 is an enricher storage mechanism, 702 is a waste recycling mechanism, 80 is a microscope, 901 is a sample adding member, 902 is a chromatography column, 101 is an enriching housing, 102 is a suction connection portion, 103 is a blocking member, 104 is a support portion, 105 is a mounting cavity, 106 is a cushion body member, 107 is an annular support surface, 1011 is a sidewall, 1012 is a bottom wall, 1013 is a sidewall, 1014 is a filtrate suction channel, 1015 is an airflow channel, 201 is a power mechanism, 202 is a controller, 203 is a timer, 204 is a pressure sensor, 101A is a first housing, 101B is a second housing, 104A is a support column, and 104B is a limiting protrusion.

DETAILED DESCRIPTION OF THE EMBODIMENTS

The core of present disclosure is to provide an enricher, an enriching system, a sample preparation system, a sample detection system, an enriching method, a sample preparation method and a sample detection method, so as to reduce the detection cost of medical detection.

In addition, the embodiments shown below do not have any limiting effect on the content of the invention described in the claims. In addition, the whole content of the composition shown in the following embodiment is not limited to what is necessary for the solution of the invention described in the claim.

First Embodiment

Referring to FIGS. 1 to 33, an enricher disclosed in the embodiment of the present disclosure includes:

an enriching housing 101, the enriching housing 101 encloses an enriching cavity 1013 configured to receive a suction liquid;

a suction connection portion 102, the suction connection portion 102 is configured to be in communication with a suction mechanism 20 and the enriching cavity 1013, such that a negative pressure is generated in the enriching cavity 1013 under an action of the vacuuming mechanism; and a blocking member 103, the blocking member 103 is provided on the enriching housing 101. When the negative pressure is generated in the enriching cavity 1013, a sample is capable of penetrating the blocking member 103 to form the suction liquid entering the enriching cavity 1013, and a retentate is retained on the blocking member 103.

When the enricher 10 of the present disclosure is in use, the enriching cavity 1013 is in communication with the suction mechanism 20 via the suction connection portion 102, and a portion of the enriching housing 101 provided with the blocking member 103 is in contact with the sample.

The suction mechanism 20 operates to form the negative pressure in the enriching cavity 1013, and under an action of the negative pressure, the sample penetrates the blocking member 103 to form the suction liquid entering the enriching cavity 1013, and the retentate is retained on the blocking member 103. Different retentate can be obtained according to different selected blocking members 103, that is, a preset retentate can be obtained. Compared with the prior art, the enricher 10 can complete the enriching processing of the sample by directly contacting the sample, which does not require additional sample transferring device or sample processing device, thereby reducing the cost of sample enriching and further reducing the cost of medical detection. In addition, there is no need to transfer samples or additionally process samples when using the enricher 10, such that the time for sample enriching processing is shortened.

It should be noted that, a shape of the enriching housing 101 in the present disclosure is not specifically limited. It may be a regular structure or an irregular structure. The regular structure may be a cubic column structure, a cylindrical structure, a conical structure, and the so on. Taking the enriching housing 101 having a cylindrical structure as an example, the enriching housing 101 includes a bottom wall 1012 and a sidewall 1011 extending from an edge of the bottom wall 1012 in the axial direction. The sidewall 1011 rotates circumferentially to form a closed structure. The sidewall 1011 has a cylindrical structure, a conical structure, or a cubic column structure. Of course, other structure types are not excluded, and it is within the protection scope of the present disclosure as long as the structure has a structure configured to bear and enclose the enriching cavity 1013. In FIGS. 1 to 9, 14, 16 to 24 and 26 to 33, the sidewall 1011 has a cylindrical structure. In FIGS. 10 to 13, 15 and 25, the sidewall 1011 has a conical structure. When the sidewall 1011 has a conical structure, along the axial direction of the enriching housing 101, a cross-section of the enriching cavity 1013 gradually decreases from top to bottom. This arrangement facilitates the mounting of subsequent components.

An inner surface of a housing wall of the enriching housing 101 corresponds to the enriching cavity 1013, and an outer surface of the housing wall of the enriching housing 101 corresponds to the outside. When the enriching housing 101 includes a bottom wall 1012 and a sidewall 1011, the sidewall 1011 also has an outer surface and an inner surface correspondingly, and the bottom wall 1012 also has an outer surface and an inner surface correspondingly. Thus, the outer surface includes the outer surface in correspondence with the bottom wall 1012 and the outer surface in correspondence with the sidewall 1011.

The enriching housing 101 can be made of plastic, resin, glass and so on, it is within the protection scope of the present disclosure as long as it has a structure enclosing the enriching cavity 1013.

Referring to FIGS. 2 to 9, in order to facilitate the extraction of the suction liquid in the enriching cavity 1013 for corresponding detection, in the embodiment of the present disclosure, the housing wall of the enriching housing 101 is provided with a suction channel 1014 in communication with the enriching cavity 1013. The suction liquid in the enriching cavity 1013 can be suctioned through the suction channel 1014. An opening of the suction channel 1014 is provided on the inner surface of the enriching housing 101 or the outer surface of the enriching housing 101. When the opening of the suction channel 1014 is provided on the inner surface of the enriching housing 101, an annular support surface 107 is provided at the opening to support subsequent operation components for the convenience of operation.

The suction connection portion 102 serves to communicate the suction mechanism 20 and the enriching cavity 1013. The suction connection portion 102 is a hole, an opening, a joint and other structures that are in communication with the enriching cavity 1013, which can be arranged on the housing wall of the enriching housing 101. The specific positions of the enriching housing 101 may vary depending on different structures thereof, but its overall function is to communicate the suction mechanism 20 and the enriching cavity 1013, and to generate the negative pressure in the enriching cavity 1013 under an action of the suction mechanism 20. Preferably, the position of the suction connection portion 102 is aligned with the blocking member 103 directly. As such, the actual volume of the enriching cavity 1013 is the largest, and the ability to contain the suction liquid is the strongest.

The blocking member 103 serves to enrich the sample. When the negative pressure is generated in the enriching cavity 1013, the sample is capable of penetrating the blocking member 103 to form the suction liquid entering the enriching cavity 1013, and the retentate is retained on the blocking member 103. The blocking member 103 is provided on the enriching housing 101, and is connected to the enriching housing 101 by adhesive, heat fusion or latching. The blocking member 103 is a filter membrane or a filter screen. The filter membrane or the filter screen is selected depending on the sample to be enriched. When the filter membrane is selected, a filter membrane with microporous is usually adopted, and the pore size of the filter microporous of the filter membrane is usually determined according to the formed component to be detected in the sample. The pore size correspondence of different formed component and the filter membrane with microporous can be classified according to experience, and then be selected during specific operations. The blocking member 103 can be one layer or more layers. Referring to FIGS. 10 to 13, when a multi-layer blocking member 103 is provided at an end of the enriching cavity, the multi-layer blocking members have apertures of different sizes, and a mounting method of the multi-layer blocking members is that the blocking member with a large aperture is sleeved on the blocking member with a small aperture.

Referring to FIGS. 2 to 33, the blocking member 103 serves to enrich the sample, that is, to retain the retentate on the blocking member 103. When the enriching is completed, the retentate needs to be transferred to the sample carrier, so as to complete further detection. As such, in order to prevent the blocking member 103 from breaking or recessing into the enriching cavity under the action of the negative pressure, a cushion body member 106 is provided. The cushion body member 106 is provided as an elastic member capable of being in a compressed state when subjected to an external force. When the retentate is transferred, the sample carrier will be in contact with the blocking member 103. During the contact process, since the cushion body member 106 is capable of being in a compressed state when subjected to the external force, the blocking member 103 can be deformed, which can effectively avoid the damage caused by the rigid contact between the detection carrier 50 and the blocking member 103, thereby facilitating the transfer of retentate. The cushion body member 106 can be connected to the enriching housing 101 by adhesion, heat fusion, latching, snapping and so on. Alternatively, referring to FIGS. 3, 7, 12, 16, 18, 20, 26, 28, 30 and 32, a mounting cavity 105 is formed on the enriching housing 101, and the cushion body member 106 is provided in the mounting cavity 105. A part where the mounting cavity 105 is mounted with a blocking member 103, and the cushion body member 106 is configured to be in contact with the blocking member 103.

Referring to FIGS. 9, 21, 23, 31 and 33, in order to further facilitate the transfer of the retentate on the blocking member 103, at least a portion of the cushion body member 106 protrudes from the outer surface of the enriching housing 101. When the retentate on the blocking member 103 is transferred, since at least a portion of the cushion body member 106 protrudes from the outer surface of the enriching housing 101, the blocking member 103 in contact with the cushion body member 106 protrudes from the outer surface of the enriching housing under the protrusion action of the cushion body member 106, such that the blocking member 103 will not be recessed inwardly. Besides, since the blocking member 103 is provided as an elastic member, when the blocking member 103 is in contact with the detection carrier 50 and transfers the retentate to the detection carrier, it is equivalent to an elastic extrusion process, most of the retentate on the blocking member 103 can be transferred to the detection carrier, thereby further improving the transferring effect. In this embodiment, since the positions of the suction connection portion 102 and the blocking member 103 on the enriching housing 101 can be adjusted relatively, the outer surface can be the overall outer surface of the housing wall of the enriching housing 101. The names of the housing wall of different portions in different structures are slightly different, which are all within the scope of the present disclosure.

In this embodiment, the cushion body member 106 is provided as a sponge, and the sponge has the effect of absorbing moisture. By providing the sponge, the suction liquid in the enriching cavity 101 can be effectively prevented from flowing backward and the retentate is kept moisturizing, which further improves the enriching effect of the retentate.

In this embodiment, a support component 104 is further provided to support the cushion body member 106, and the support component 104 is provided as a sheet, a honeycomb, a column and so on, as long as the structure can achieve supporting the cushion body member 106, it is within the scope of protection of the present disclosure.

In this embodiment, the support component 104 is configured to be integrally formed with the enriching housing 101, or the support component 104 and the enriching housing 101 are detachable structures. Referring to FIGS. 2 to 23, the support component 104 and the enriching housing 101 shown in the figures form an integral structure. Referring to FIGS. 24 to 45, the support component 104 and the enriching housing 101 shown in the figures are detachable structures.

Referring to FIGS. 14 to 23, when the support component 104 and the enriching housing 101 form an integral structure, the support component 104 is formed by the housing wall of the enriching housing 101 extending in the radial direction and/or the axial direction of the enriching housing 101. Taking the enriching housing 101 having a cylindrical structure as an example and referring to FIGS. 2, 3, 8 to 11, 16, 17, and 18 to 23, the support component 104 can be regarded as the bottom wall 1012 (when the enriching housing does not have a bottom wall) extending from the sidewall 1011 of the enriching housing in the radial direction, or can be regarded as the bottom wall 1012 (when the enriching shell has a bottom wall) extending in the axial direction. When the support component 104 and the enriching housing 101 form the integral structure, the mounting cavity 105 is configured to be formed by enclosing the support component 104 and the sidewall 1011. For example, the support component 104 extends as the bottom wall 1012 or extends as a support rib or a support grid, which may enclose with the sidewall 1011 to form the mounting cavity 105. When the support component 104 extends to form the bottom wall 1012, the bottom wall 1012 may also be recessed to form the mounting cavity 105, while the support component 104 is provided with a communication hole 1041 and is in communication with the enriching cavity 1013 via the communication hole 1041.

Referring to FIGS. 24 to 33, when the support component 104 and the enriching housing 101 are detachable structures, the support component 104 is connected to the housing wall of the enriching housing 101. Specifically, the fixing method may be that the support component 104 is snapped with the housing wall of the enriching housing 101 or limited by other limiting members. Referring to FIGS. 26, 28, 30 and 32, when the support component 104 is snapped on the inner wall of the sidewall 1011, the mounting cavity 105 is formed by the sidewall 1011 and the support component 104.

In this embodiment, both the bottom wall and the sidewall are the housing walls of enriching housing. Both the bottom wall and the sidewall have the inner surface and the outer surface respectively, or the inner surface of sidewall is called inner wall, the outer surface of sidewall is called the outer wall and so on, which are also referred to as the housing wall in this embodiment.

In this embodiment, the aforementioned description describes in detail the situation in which the support component 104 supports the cushion body member 106, that is, both the support component 104 and the cushion body member 106 are provided in the aforementioned description. It should be noted that, as shown in FIGS. 2, 14, 15 and 24, only the support component 104 may be provided individually. At this time, the support component 104 is equivalent to the cushion body member 106, and it can also realize the function of the cushion body member 106 individually, that is, to prevent the situations that the blocking member 103 is recessed, which is not beneficial to transfer the retentate, the blocking member 103 is subjected to a force and broken under an action of a negative pressure suction, and so on. Especially when the support component 104 is configured to be detachably connected to the enriching housing 101, the support component 104 can be made of the same material as the cushion body member 106, such as an elastic member, specifically a sponge. The sponge is mounted on the enriching housing 101 in a manner similar to the aforementioned cushion body member 106. At this time, the support component 104 can also be provided as at least a portion thereof extends from the outer surface of the enriching housing 101.

In conclusion, those skilled in the art should understand that although the names of the support component 104 and the cushion body member 106 in this embodiment are different, in the case where both of them are provided, the support component 104 plays the role of supporting the cushion body member 106, but when only the cushion body member 106 or the support component 104 is provided individually, although the names of both of them are inconsistent, it should be understood that as long as it plays a role in preventing the blocking member 103 from recessing or breaking, both of them are the same component, and the substantial scopes thereof are the same.

Second Embodiment

Referring to FIGS. 34 to 39, an enriching system of the present disclosure includes a suction mechanism 20 and any one of the aforementioned enrichers 10 in the first embodiment. The suction mechanism 20 is configured to be connected to the suction connection portion 102, the suction mechanism 20 is configured to be capable of generating the negative pressure in the enriching cavity 1013 of the enricher 10.

When the enriching system is in use, the suction connection portion 102 is connected to the suction mechanism 20, and the enricher 10 is moved such that the blocking member 103 of the enricher 10 is placed below a liquid level of the sample. The suction mechanism 20 operates to generate the negative pressure in the enriching cavity 1013. The sample penetrates through the blocking member 103 to form the suction liquid under the action of the negative pressure and enters the enriching cavity 1013, and the retentate is retained on the blocking member 103. Compared with the prior art, when adopting the enriching system of the present disclosure, the enricher 10 is capable of being in contact with the sample directly to complete the enriching processing of the sample, and does not require additional sample transfer device or sample processing device, thereby reducing the cost of sample enriching and further reducing the cost of medical detection. In addition, since this enricher 10 is adopted, there is no need to transfer samples or process samples additionally, such that the time for sample enriching processing is shortened.

The aforementioned suction mechanism 20 may be a device capable of generating the negative pressure, such as a syringe, a vacuum generator, and so on. The present disclosure preferably adopts a vacuum generator, which is convenient to realize automatic control.

In order to improve the operation accuracy, the enriching system further includes: a power mechanism 201 configured to drive the enricher 10 to move. The power mechanism 201 enables the enricher 10 to move below the liquid level of the sample, and when the enriching is completed, the power mechanism 201 enables the enricher 10 to be moved out of the liquid level of the sample.

In order to further improve operation accuracy and automation of operation, the enriching system further includes:
a controller 202 pre-storing a target distance of the enricher 10. When the enricher 10 moves to the target distance, the controller 202 controls the power mechanism 201 to stop moving. At this time, a distance measuring device configured to measure the operation distance of the enricher 10 is further included.

It should be noted here that this target distance can be converted into a target operation time of the power mechanism 201 or the target number of steps of the power mechanism 201. When the target distance is converted into the target operation time, the target operation time of the enricher 10 is pre-stored and the operation time of the power mechanism 201 is recorded. When the operation time of the moving enricher 10 is equal to the target time, the power mechanism 201 is controlled to stop moving. At this time, an enricher timer for recording the operation time of the enricher 10 is further included.

When the target distance is converted into the target number of steps, the target number of steps of the enricher 10 is pre-stored, and the number of operation steps of the power mechanism 201 is recorded. When the number of operation steps that the enricher 10 moves is equal to the target number of steps, the power mechanism 201 is controlled to stop moving. At this time, a counter configured to record the number of operation steps of the power mechanism 201 is further included.

Further, in order to further optimize the aforementioned solutions, a timer 203 is further included, and the timer 203 is configured to record the operation time of the suction mechanism 20.

The controller 202 further pre-stores the target operation time of the suction mechanism 20. When the operation time of the suction mechanism 20 reaches the target operation time, the controller 202 controls the suction mechanism 20 to stop operating.

Since the enriching system does not need to carry out the unlimited suction treatment during the operation process, by pre-storing the target operation time, the operation process of the suction mechanism 20 can be effectively controlled, which is convenient for automatic control and reduces the work intensity of the operator.

In order to ensure the safety during the operation, a pressure sensor 204 configured to collect the operation pressure of the suction mechanism 20 is further included.

The controller 202 further pre-stores a target pressure of the suction mechanism 20. When the operation pressure reaches the target operation pressure, the operation of the suction mechanism 20 is stopped.

When the operation pressure of the suction mechanism 20 exceeds the target pressure, it means that the blocking member 103 is blocked. At this time, regardless of whether the operation time of the suction mechanism 20 reaches the target operation time, the operation of the suction mechanism 20 is stopped.

Third Embodiment

Referring to FIGS. 40 to 43, the sample preparation system disclosed in the embodiment of the present disclosure includes a sample transferring mechanism 40 and any one of the enriching systems according to the second embodiment. The sample transferring mechanism 40 is configured to transfer the retentate on the blocking member 103 to a detection carrier 50.

When using the sample preparation system in the embodiment of the present disclosure, the sample transferring mechanism 40 transfers the retentate on the enricher 10 after enriching by the enriching system to the detection carrier 50 to prepare the sample specimen. Due to adopting the sample preparation system of the present disclosure and adopting the samples after enriching processing by the enriching system, the number of times of sample transfer is reduced during the period, and thus the cost is reduced. Since there are fewer intermediate stages, the sample preparation accuracy can be improved and the detection rate of the sample can be improved.

The sample transferring mechanism 40 is configured to drive the enricher 10 to move along the vertical direction and/or the horizontal direction to be in contact with the detection carrier 50.

The sample preparation system in the embodiment of the present disclosure further includes an elution container configured to contain an elution solution to elute the retentate retained on the blocking member 103 of the enricher 10 into the elution solution to form a concentrated suspension. The sample transferring mechanism 40 is provided as a sample suction member to add the concentrated suspension to the detection carrier 50. As such, the sample preparation can be performed according to different detections.

Because in some detection processes, the sample needs to be stained to facilitate detection, the sample preparation system in the embodiment of the present disclosure further includes a sample staining mechanism 60 configured to stain the retentate on the detection carrier 50. The staining mechanism 60 is a dry staining mechanism 60 or a wet staining mechanism 60. The dry staining mechanism 60 is capable of performing dry staining on the sample, and the wet staining mechanism 60 is capable of performing wet staining on the sample.

The sample detection system in the embodiment of the present disclosure further includes an enricher storage mechanism 701 and/or a waste recycling mechanism 702. Since the enricher 10 is a disposable consumable, a plurality of enrichers 10 can be stored by providing the enricher storage mechanism 701, and after application, the enricher 10 can be replaced with a new enricher, which is convenient for operation. The waste recycling mechanism 702 is configured to recycle the used enricher 10, and the problem of medical pollution can be reduced by recycling the used enricher 10.

Fourth Embodiment

Referring to FIGS. 44 to 51, the sample detection system disclosed in the embodiment of the present disclosure includes a microscope 80 and any one of the sample preparation systems according to the third embodiment, and the microscope 80 is configured to microscopically examine the specimen.

The specimen prepared by the sample preparation system in the third embodiment is subjected to microscopic examination using the microscope 80. Since the samples are subjected to enriching processing, the detection efficiency of the samples can be improved. In addition, since the number of sample transfers is reduced during the enriching process, the time for sample detection can be saved, and the shorter the time elapsed before the sample is microscopically examined, the higher and more accurate the detection rate will be during the microscopic examination.

The sample detection system in the embodiment of the present disclosure further includes a sample adding member 901 and a dry chemical detection mechanism. The sample adding member 901 is configured to suck the suction liquid or a sample liquid in the enriching cavity 1013, and will add the suction liquid or the sample liquid to a chemical detection carrier. The dry chemical detection mechanism is configured to perform color recognition on the chemical detection carrier.

The aforementioned sample adding member 901 can absorb the suction liquid in the enriching cavity 1013 after exiting the suction mechanism 20 after the enriching process; or absorb the suction liquid in the enriching cavity 1013 during the enriching process. Referring to FIGS. 46 to 49, during the enriching process, the sample adding member 901 is connected to the suction connection portion 102 of the enricher 10. The sample adding member 901 is connected to the suction mechanism 20, and the enricher 10 is moved such that the blocking member 103 of the enricher 10 is completely immersed under the liquid level of the sample in the sample receiving device 30. The suction mechanism 20 operates, such that a negative pressure state is formed in the inner cavity of the sample adding member 901, and the sample in the sample receiving device 30 enters the enriching cavity 1013 through the blocking member 103, and then enters the inner cavity of the sample adding member 901. When dry chemical detection of the suction liquid is required, the suction mechanism 20 drives the sample adding member 901 to exit the enricher 10, and then the sample adding member 901 adds the suction liquid in the cavity to a chemical detection carrier 50 for color recognition.

Figure 48:
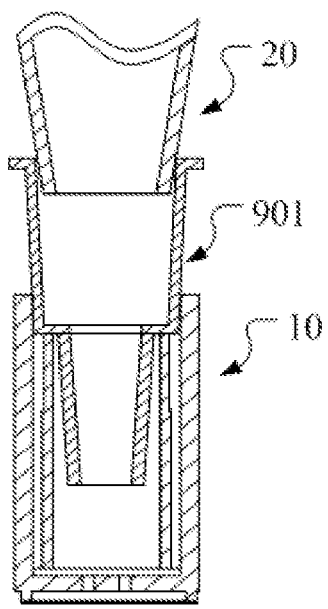
Figure 49:
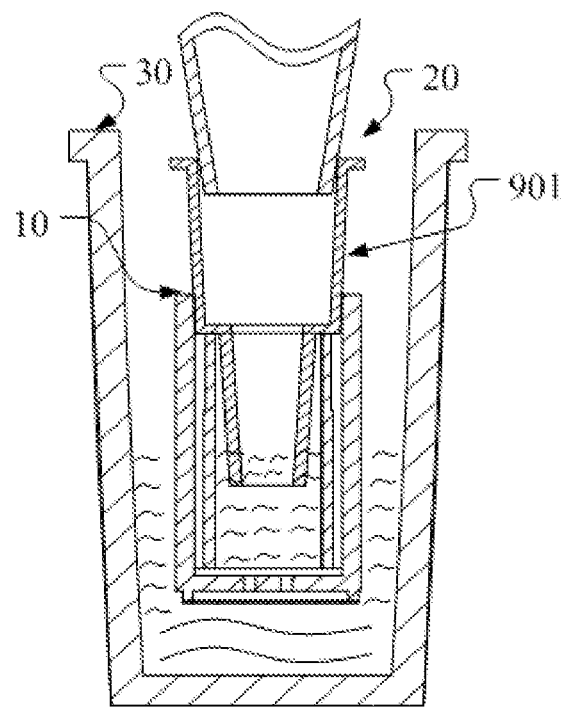

Referring to FIGS. 48 and 49, when the enricher 10 is provided with a suction channel 1014, the sample adding member 901 is connected to the suction connection portion 102 of the enricher 10, and the outer surface of the sample adding member 901 blocks the opening of the suction channel 1014 on the inner surface of the enriching housing 101. The sample adding member 901 is connected to the suction mechanism 20, and the enricher 10 is moved such that the blocking member 103 of the enricher 10 is completely immersed below the liquid level of the sample in the sample receiving device 30. The suction mechanism 20 operates, such that the negative pressure state is formed in the inner cavity of the sample adding member 901. The sample in the sample receiving device 30 enters the enriching cavity 1013 through the blocking member 103. When the suction liquid needs to be sucked after the enriching is completed, the enricher 10 is rotated, such that the opening of the suction channel 1014 located on the inner surface of the enriching housing 101 is opened. At this time, the suction mechanism 20 operates because the enriching cavity 1013 is in communication with the outside. The suction liquid in the enriching cavity 1013 is capable of entering the inner cavity of the sample adding member 901 smoothly. When dry chemical detection of the suction liquid is required, the suction mechanism 20 drives the sample adding member 901 to exit the enricher 10, and then the sample adding member 901 adds the suction liquid in the cavity to the chemical detection carrier 50 for color recognition.

Referring to FIGS. 50 and 51, the sample detection system in the embodiment of the present disclosure further includes a chromatography column 902 configured to separate target molecules in the pumped liquid by column chromatography. In use, the chromatography column 902 is placed in the enriching cavity 1013.

Fifth Embodiment

Referring to FIG. 52, the enriching method disclosed in the embodiment of the present disclosure, the applied enriching system includes a suction mechanism 20 and an enricher 10. The suction mechanism 20 is configured to be connected to the suction connection portion 102 and generate the negative pressure in the enriching cavity 1013 of the enricher 10. The enricher in the enriching system includes an enriching housing 101, a suction connection portion 102 and a blocking member 103. The enriching housing 101 encloses to form an enriching cavity 1013 configured to receive the suction liquid. The suction connection portion 102 is configured to be in communication with the suction mechanism 20 and the enriching cavity 1013, such that the negative pressure is formed in the enriching cavity 1013 under an action of a vacuuming mechanism. The blocking member 103 is provided on the enriching housing 101. When the negative pressure is formed in the enriching cavity 1013, the sample can form the suction liquid through the blocking member 103 and enter the enriching cavity 1013, and the retentate is retained on the blocking member 103.

Specifically, the enriching method includes the following steps:

In S1, the suction connection portion 102 of the enricher 10 is connected to the suction mechanism 20.

In the connecting process, the suction connection portion 102 is connected to the suction mechanism 20 via moving the enricher 10, or the suction connection portion 102 is connected to the suction mechanism 20 via moving suction mechanism 20, or the suction connection portion 102 is connected to the suction mechanism 20 by moving the enricher 10 and the suction mechanism 20 simultaneously. The aforementioned moving process can be performed manually or by the power mechanism 201.

In S2, the enricher 10 is moved to be immersed in the sample liquid in the sample receiving device 30.

The enricher 10 is moved by manual operation, and moved by automatic control. When automatic control is required to move, the step S2 includes that the target distance of the enricher 10 is pre-stored, and when the enricher 10 moves the target distance, the enricher 10 is stopped moving. As a structural support, the enriching system includes a controller 202 and a power mechanism 201. The power mechanism 201 is configured to drive the enricher 10 to move, and the enricher 10 is capable of being moved below the liquid level of the sample via the power mechanism 201. When the enriching is completed, the enricher 10 is capable of being moved out of the liquid level of the sample via the power mechanism 201. The controller 202 pre-stores the target distance of the enricher 10. When the enricher moves the target distance, the power mechanism 201 is controlled to stop moving. At this time, a distance measuring device configured to measure the operation distance of the enricher 10 is further provided.

It should be noted here that this target distance can be converted into the target operation time of the power mechanism 201 or the target number of steps of the power mechanism 201. When the target distance is converted into the target operation time, step S2 includes that the target operation time of the enricher 10 is pre-stored and the operation time of the power mechanism 201 is recorded, and when the operation time that the enricher 10 moves is equal to the target time, the power mechanism 201 is controlled to stop moving. In this time, the enriching system includes a timer 203 configured to record the operation time of the enricher 10.

When the target distance is converted into the target number of steps, step S2 includes that the target number of steps of the enricher 10 is pre-stored and the number of operation steps of the power mechanism 201 is recorded, and when the number of operation steps that the enricher 10 moves is equal to the target number of steps, the power mechanism 201 is controlled to stop moving. At this time, the enriching system includes a counter configured to record the number of operation steps of the power mechanism 201.

In S3, the suction mechanism 20 is operated, such that the sample liquid enters the enriching cavity 1013 through the blocking member 103.

The operation of the suction mechanism 20 is performed by manual operation, performed by automatic control. When the operation is performed by automatic control, the step S3 includes that the target operation time of the suction mechanism 20 is pre-stored, and when the operation time of the suction mechanism 20 reaches the target operation time, the operation of the suction mechanism 20 is stopped. The enriching system includes a timer 203 configured to record the operation time of the suction mechanism 20. The controller 202 also pre-stores the target operation time of the suction mechanism 20. When the operation time of the suction mechanism 20 reaches the target operation time, the suction mechanism 20 is controlled to stop operating. Since the enriching system does not need to perform unlimited suction during the operation, the operation process of the suction mechanism 20 can be effectively controlled by pre-storing the target operation time, which facilitates automatic control and reduces the operator's work intensity.

In order to further ensure the safety of the device, the step S3 further includes that an early warning pressure of the suction mechanism 20 is pre-stored, the operation pressure of the suction mechanism 20 is collected, and when the operation pressure reaches the early warning pressure, the operation of the suction mechanism 20 is stopped. The enriching system includes a pressure sensor 204 configured to collect the operation pressure of the suction mechanism 20. The controller 202 also pre-stores the target pressure of the suction mechanism 20. When the operation pressure reaches the target operation pressure, the operation of the suction mechanism 20 is stopped. When the operation pressure of the suction mechanism 20 exceeds the target pressure, it means that the blocking member 103 is blocked. At this time, regardless of whether the operation time of the suction mechanism 20 reaches the target operation time, the suction mechanism 20 stops and continues to operate.

In this embodiment, after step S2 and before step S3, the enriching method further includes that air is blown into the sample liquid in the sample container. Clean gas is first blown into the sample liquid via the air generator, such that the sample liquid forms convection under an action of an airflow, such that the sample liquid becomes a suspension, and the formed components originally deposited at the bottom under an action of the gravity are distributed in each layer of the sample liquid, such that more formed components can be collected during subsequent enriching.

Figure 57:
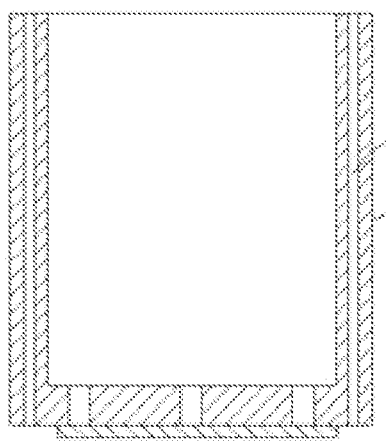
FIGS. 57 and 58 are schematic views of an enricher according to a ninth embodiment of the present disclosure.
Figure 58:
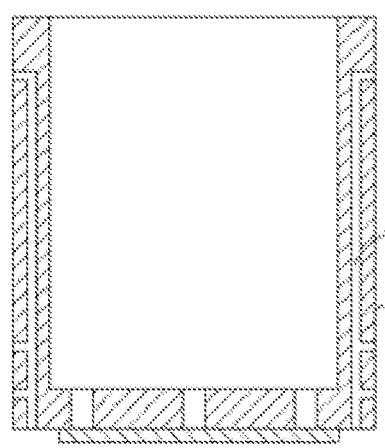

There are various ways of blowing air. A blowing unit may be provided individually to be inserted into the sample liquid to blow air, or it may be the aforementioned enricher, which discharges clean air from the enriching cavity to the sample liquid via a suction mechanism, it is also possible to use the enricher as shown in FIGS. 57 to 58, and air is blown through the air flow channel on the enricher.

Sixth Embodiment

Referring to FIG. 53, the sample preparation method disclosed in the embodiment of the present disclosure includes any one of the enriching methods according to the fifth embodiment, and after step S3, the enriching method further includes:

In S4, the retentate retained by the blocking member 103 is transfer to the detection carrier 50.

In this step, the retentate retained on the blocking member 103 is transferred to the detection carrier 50 by manual operation, or the retentate retained on the blocking member 103 is transferred to the detection carrier 50 by automatic control. The transferring of the retentate is realized by moving the enricher 10, or by moving the detection carrier 50.

In an embodiment of the present disclosure, the step S4 includes that the enricher 10 is moved in a vertical direction, and the blocking member 103 of the enricher 10 is in contact with the detection carrier 50; and/or the enricher 10 is moved in a horizontal direction, and the blocking member 103 of the enricher 10 is in contact with the detection carrier 50. Specifically, the aforementioned steps are realized by providing the sample transferring mechanism 40.

Further, in order to carry out different detections, the step S4 further includes that the retentate retained on the blocking member 103 of the enricher 10 is eluted in an elution solution to form a concentrated suspension. The concentrated suspension is added to the detection carrier 50. The corresponding sample preparation system is realized by providing the elution vessel. The elution container is configured to contain an elution solution to elute the retentate retained on the blocking member 103 of the enricher 10 into the elution solution to form a concentrated suspension. The sample transferring mechanism 40 is provided as a sample suction member to add the concentrated suspension onto the detection carrier 50. In this way, sample preparation can be performed according to different detections.

Since in some detection processes, the sample needs to be stained to facilitate detection, after step S4, the sample preparation method further includes that the retentate on the detection carrier 50 is stained. The corresponding sample preparation system is realized by providing a sample staining mechanism 60 configured to stain the retentate on the pair of detection carriers 50. The staining mechanism 60 is a dry staining mechanism 60 or a wet staining mechanism 60. The dry staining mechanism 60 is capable of performing dry staining on the sample, and the wet staining mechanism 60 is capable of performing wet staining on the sample.

In order to facilitate subsequent operations after the sample preparation is completed, the step S4 further includes that the enricher 10 is discarded and the enricher 10 is replaced with a new one. The discarded enricher 10 is stored in the waste recycling mechanism 702, and the problem of medical pollution can be reduced by recycling the used enricher 10. Further, a plurality of enrichers 10 may be pre-stored to facilitate replacement of new enricher 10.

Seventh Embodiment

Figure 54:
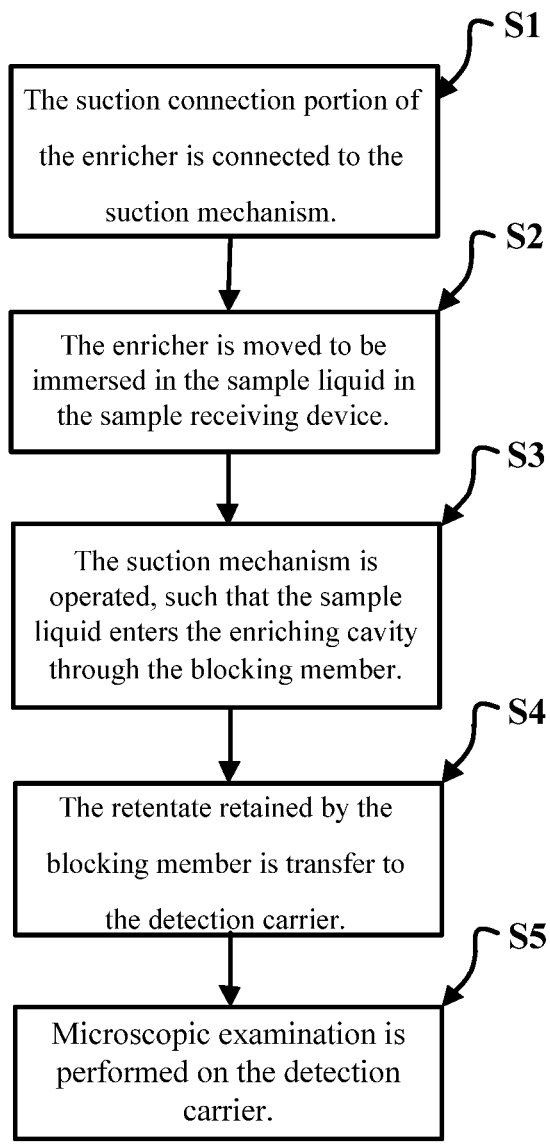
FIG. 54 is a schematic flowchart of a sample detection method according to a seventh embodiment of the present disclosure.

Referring to FIG. 54, a sample detection method disclosed in the embodiment of the present disclosure includes any one of the specimen preparation methods according to the sixth embodiment, and after step S4 of specimen preparation method, the method further includes:

In step S5, microscopic examination is performed on the detection carrier 50. The microscopic examination is performed by the microscope 80.

Further, in addition to being capable of performing microscopic examination, the sample after enriching in the fifth embodiment can also be performed by other detections. For example, this sample detection method further includes dry chemical detection. The dry chemical detection includes that the suction liquid or the sample liquid in the enriching cavity 1013 is sucked, and is added to the chemical detection carrier 50 to perform chemical color detection. After the enriching processing is completed, the suction mechanism 20 exits and the suction liquid in the enriching cavity 1013 is sucked. Or during the enriching processing, the suction liquid in the enriching cavity 1013 is sucked. Referring to FIGS. 46 to 51, during the enriching process, the sample adding member 901 is connected to the suction connection portion 102 of the enricher 10. The sample adding member 901 is connected to the suction mechanism 20, and the enricher 10 is moved such that the blocking member 103 of the enricher 10 is completely immersed under the liquid level of the sample in the sample receiving device 30. The suction mechanism 20 operates, such that a negative pressure state is formed in the inner cavity of the sample adding member 901, and the sample in the sample receiving device 30 enters the enriching cavity 1013 through the blocking member 103, and then enters the inner cavity of the sample adding member 901. When dry chemical detection of the suction liquid is required, the suction mechanism 20 drives the sample adding member 901 to exit the enricher 10, and then the sample adding member 901 adds the suction liquid in the cavity to the chemical detection carrier 50 for color recognition.

Referring to FIGS. 2 to 9, when the enricher 10 is provided with a suction channel 1014, the sample adding member 901 is connected to the suction connection portion 102 of the enricher 10, and the outer surface of the sample adding member 901 blocks the opening of the suction channel 1014 located on the inner surface of the enriching housing 101. The sample adding member 901 is connected to the suction mechanism 20, and the enricher 10 is moved such that the blocking member 103 of the enricher 10 is completely immersed below the liquid level of the sample in the sample receiving device 30. The suction mechanism 20 operates, such that the negative pressure state forms in the inner cavity of the sample adding member 901, and the sample in the sample receiving device 30 enters the enriching cavity 1013 through the blocking member 103. When the suction liquid needs to be sucked after the enriching is completed, the enricher 10 is rotated, such that the opening of the suction channel 1014 located on the inner surface of the enriching housing 101 is opened. At this time, the suction mechanism 20 operates because the enriching cavity 1013 is in communication with the outside. The suction liquid in the enriching cavity 1013 is capable of entering the inner cavity of the sample adding member 901 smoothly. When dry chemical detection of the suction liquid is required, the suction mechanism 20 drives the sample adding member 901 to exit the enricher 10, and then the sample adding member 901 adds the suction liquid in the cavity to the chemical detection carrier 50 for color recognition.

Further, in addition to being capable of performing microscopic examination, the sample after enriching in the fifth embodiment can also be performed by other detections. The sample detection method further includes chromatographic column 902 processing. The chromatographic column 902 processing includes that the chromatographic column 902 is placed in the suction liquid of the enriching cavity 1013, and the target molecules in the suction liquid are separated by column chromatography.

Eighth Embodiment

Figure 55:
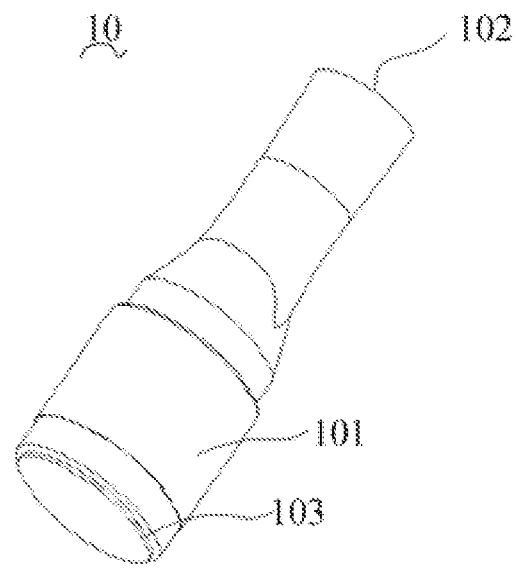
FIG. 55 is perspective view of an enricher according to an eighth embodiment of the present disclosure.
Figure 56:
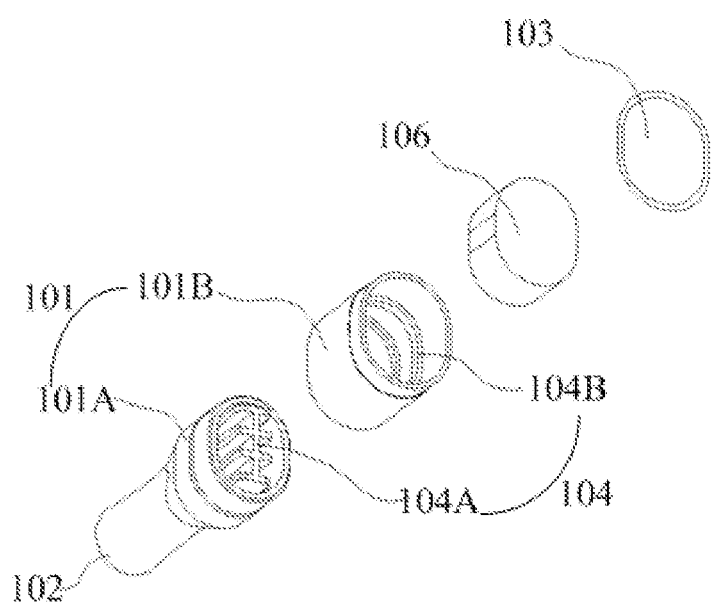
FIG. 56 is an explosive view of an enricher according to the eighth embodiment of the present disclosure.

As shown in FIGS. 55 to 56, the difference between the enricher in this embodiment and the enricher in the first embodiment is that the enriching housing 101 includes a first housing 101A and a second housing 101B. The suction connection portion 102 is provided on the first housing 101A, the second housing 101B is configured to be detachably connected to the first housing 101A. After the enriching housing 101 is configured in two parts, the support component 104 is provided as a support column 104A or a limiting protrusion 104B, or the support component 104 includes both the support column 104 and the limiting protrusion 104B for better support of the cushion body member 106. The support column 104A is formed by the inner wall of the first housing 101A extends in the axial direction. The cross section of the support column 104A has a grid shape to facilitate mold preparation, which is specifically similar to the shape of a Chinese character " 王 " or a Chinese character "#". The limiting protrusion 104B is formed by the inner wall of the second housing 101B extending in the radial direction and is configured to support the middle portion of the cushion body member 106. It forms a ring shape protruding from the inner wall of the second housing 101B and is configured to support the peripheral portion of the cushion body member 106. In this embodiment, the first housing 101A and the second housing 101B are arranged by sleeving with each other. Specifically, the inner wall of the second housing 101B is sleeved around the outer wall of the first housing 101A in an interference fit to prevent disengaging from each other, or the two are glued together to prevent disengaging from each other. In this embodiment, the enriching housing 101 is split into a plurality of parts, which is beneficial to the subsequent processes such as the production, processing, and assembly of the enricher. First, after the enriching housing is split, the production mold of each constituent component has a simple structure, such that the mold processing cost is low, the service life is long, and each constituent component has a simple structure in the production process to be demoulded easily, which facilitates mass production and high yield rate, and facilitates assemble and processing.

Ninth Embodiment

As shown in FIGS. 57 to 58, the difference between the enricher in this embodiment and the enricher in the first embodiment is that the sidewall of the enriching housing 101 is provided with an airflow channel 1015, and the airflow channel 1015 is isolated from and not in communication with the enriching cavity 1013. The inlet and the outlet of the airflow channel 1015 are both provided on the enriching housing. The airflow channel 1015 is in communication with the air generator. The air generator generates airflow to enter the airflow channel 1015. When the enricher in this embodiment extends into the sample liquid for enriching, the air generator is configured to blow clean gas into the sample liquid before enriching, such that the sample liquid forms convection under the action of the airflow, such that the sample liquid forms the suspension. The formed components originally deposited at the bottom under the action of the gravity are distributed in each layer of the sample liquid, such that more formed components can be collected during subsequent enriching. In this embodiment, the inlet of the airflow channel 1015 may be arranged at the top end or the sidewall of the enriching housing 101, and the outlet can be arranged at the sidewall or the bottom end of the enriching housing 101. The positions of the inlet and the outlet can be arbitrarily combined. The airflow channel 1015 communicate the inlet and the outlet. In this embodiment, although a negative pressure generator is capable of blowing air through the enriching cavity, providing the air flow channel 1015 individually to blow air is more fluent and effective, and will not damage the connection of the blocking member.

In the description of the present disclosure, it should be noted that the orientation or positional relationship indicated by the terms "center", "upper", "lower", "left", "right", "vertical", "horizontal", "inside", "outside" is based on the orientation or positional relationship shown in the accompanying drawings, which is only for the convenience of describing the present disclosure and simplifying the description, rather than indicating or implying that the indicated device or element must have a specific orientation or be construed and operated in a specific orientation, therefore should not be construed as a limitation of the present disclosure. Furthermore, the terms "first", "second", and "third" are used for descriptive purposes only and should not be construed to indicate or imply relative importance.

Unless otherwise clearly specified and limited, the terms "mounted", "communicated" and "connected" should be understood in a broad sense, for example, it may be a fixed connection, a detachable connection, or an integral connection. It may be a mechanical connection, or an electrical connection; it may be a direct connection, an indirect connection via an intermediate medium, or an internal communication between two elements. For those of ordinary skill in the art, the specific meanings of the aforementioned terms in this application can be understood in specific situations.

The aforementioned description of the disclosed embodiments enables any person skilled in the art to make or use the present disclosure. Various modifications to these embodiments will be readily apparent to those skilled in the art, and the generic principles defined herein may be implemented in other embodiments without departing from the spirit or scope of the present disclosure. Thus, the present disclosure is not intended to be limited to the embodiments shown herein, but is to be accorded the widest scope consistent with the principles and novel features disclosed herein.

What is claimed is:

1. An enricher, comprising:
   an enriching housing enclosing an enriching cavity configured to receive a suction liquid, wherein the enriching housing is provided with a suction connection portion configured to be in communication with a suction mechanism and the enriching cavity, such that a negative pressure is generated in the enriching cavity under an action of the suction mechanism, wherein the enriching housing includes a bottom wall and a sidewall extending from an edge of the bottom wall in an axial direction, the enriching housing is further provided with a cushion body member configured to prevent the blocking member from recessing or breaking, and wherein a middle portion of the cushion body member protrudes beyond an outer surface of the bottom wall away from the enriching cavity; and
   a blocking member provided on the cushion body member, wherein when negative pressure is generated in the enriching cavity, a sample is capable of penetrating the blocking member to form the suction liquid entering the enriching cavity, and a retentate is retained on the blocking member.

2. The enricher of claim 1, wherein the blocking member is provided as a filter screen or a filter membrane with microporous.

3. The enricher of claim 2, wherein the blocking member is connected to the enriching housing by adhesive, heat fusion or latching.

4. The enricher of claim 1, wherein the cushion body member is provided as an elastic member capable of being in a compressed state when subjected to a force.

5. The enricher of claim 4, wherein the cushion body member is provided as a sponge.

6. The enricher of claim 1, wherein the enriching housing is further provided with a support component configured to support the cushion body member.

7. The enricher of claim 6, wherein the support component is integrally formed with the enriching housing.

8. The enricher of claim 7, wherein the support component is formed by a housing wall of the enriching housing extending in a radial and/or axial direction of the enriching housing.

9. The enricher of claim 8, wherein the support component extends to form a support grid or a support rib.

10. The enricher of claim 9, wherein a mounting cavity is formed on the enriching housing, and the cushion body member is arranged in the mounting cavity.

11. The enricher of claim 6, wherein the support component is detachably connected to the enriching housing.

12. The enricher of claim 11, wherein the support component is connected to a housing wall of the enriching housing.

13. The enricher of claim 12, wherein the support component and the enriching housing form a mounting cavity, and the cushion body member is arranged in the mounting cavity.

14. An enriching system, comprising a suction mechanism and the enricher according to claim 1, wherein the suction mechanism is configured to be connected to the suction connection portion, and the suction mechanism is configured to generate the negative pressure in the enriching cavity of the enricher.

15. A sample preparation system, comprising a sample transferring mechanism and the enriching system according to claim 14, wherein the sample transferring mechanism is configured to transfer the retentate on the blocking member to a detection carrier.

16. The sample preparation system of claim 15, wherein the sample transferring mechanism is configured to drive the enricher to move in a vertical direction and/or a horizontal direction to be in contact with the detection carrier.

17. A sample detection system, comprising a microscope and the sample preparation system according to claim 15, wherein the microscope is configured to microscopically examine the sample.

18. The sample detection system of claim 17, further comprising:
   a sample adding member and a dry chemical detection mechanism, wherein the sample adding member is configured to absorb the suction liquid or a sample liquid in the enriching cavity, and add the suction liquid or the sample liquid to a chemical detection carrier, and the dry chemical detection mechanism is configured to perform color recognition on the chemical detection carrier.

* * * * *